United States Patent
Fang et al.

(10) Patent No.: US 12,445,570 B2
(45) Date of Patent: Oct. 14, 2025

(54) PHOTOGRAPHING METHOD AND ELECTRONIC DEVICE

(71) Applicant: Huawei Technologies Co., Ltd., Shenzhen (CN)

(72) Inventors: Lei Fang, Shenzhen (CN); Yuanying Nie, Xi'an (CN); Xingong Zhang, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 132 days.

(21) Appl. No.: 18/004,844

(22) PCT Filed: Jul. 8, 2021

(86) PCT No.: PCT/CN2021/105232
§ 371 (c)(1),
(2) Date: Jan. 9, 2023

(87) PCT Pub. No.: WO2022/007893
PCT Pub. Date: Jan. 13, 2022

(65) Prior Publication Data
US 2023/0262195 A1    Aug. 17, 2023

(30) Foreign Application Priority Data
Jul. 10, 2020   (CN) .................. 202010664485.X

(51) Int. Cl.
*H04N 23/661*   (2023.01)
*H04N 7/01*   (2006.01)
*H04N 23/667*   (2023.01)

(52) U.S. Cl.
CPC ......... *H04N 7/0122* (2013.01); *H04N 23/661* (2023.01); *H04N 23/667* (2023.01)

(58) Field of Classification Search
CPC .. H04N 7/0122; H04N 23/661; H04N 23/667; H04N 7/183; H04N 21/4223; H04N 23/611; H04N 23/617; H04N 7/18; H04N 23/951; H04N 23/632
See application file for complete search history.

(56) References Cited

U.S. PATENT DOCUMENTS 11,195,398 B1 * 12/2021 Fu .................. G06V 20/52
2005/0219642 A1 * 10/2005 Yachida .......... H04N 23/667
                                                    358/448

(Continued)

FOREIGN PATENT DOCUMENTS

CN    103402055 A    11/2013
CN    103685943 A    3/2014
(Continued)

*Primary Examiner* — Mekonnen D Dagnew
(74) *Attorney, Agent, or Firm* — Slater Matsil, LLP

(57) ABSTRACT

A photographing method and an electronic device. The electronic device includes a device body and a camera connected to the device body, and the device body includes a display. The camera collects a video image, obtains a video stream with first resolution based on the video image, and further obtains a photographing stream with second resolution based on the video image. The video stream and the photographing stream are transmitted to the device body through different transmission channels.

20 Claims, 14 Drawing Sheets

(56) References Cited

U.S. PATENT DOCUMENTS

| | | | | |
|---|---|---|---|---|
| 2009/0070675 | A1* | 3/2009 | Li | H04N 1/00127 |
| | | | | 715/866 |
| 2015/0058709 | A1* | 2/2015 | Zaletel | G06F 16/252 |
| | | | | 715/202 |
| 2017/0142345 | A1 | 5/2017 | Marman et al. | |
| 2018/0167671 | A1* | 6/2018 | Kurita | H04N 21/4122 |
| 2019/0012332 | A1 | 1/2019 | Newman et al. | |
| 2020/0221024 | A1 | 7/2020 | Lee et al. | |

FOREIGN PATENT DOCUMENTS

| | | |
|---|---|---|
| CN | 204697153 U | 10/2015 |
| CN | 105578008 A | 5/2016 |
| CN | 107087169 A | 8/2017 |
| CN | 107241540 A | 10/2017 |
| CN | 108769755 A | 11/2018 |
| CN | 109194923 A | 1/2019 |
| CN | 110363881 A | 10/2019 |
| CN | 110383822 A | 10/2019 |
| CN | 110401798 A | 11/2019 |
| CN | 110674758 A | 1/2020 |
| JP | 2006325150 A | 11/2006 |
| JP | 2013090006 A | 5/2013 |
| JP | 2015095799 A | 5/2015 |
| JP | 2019186961 A | 10/2019 |

\* cited by examiner

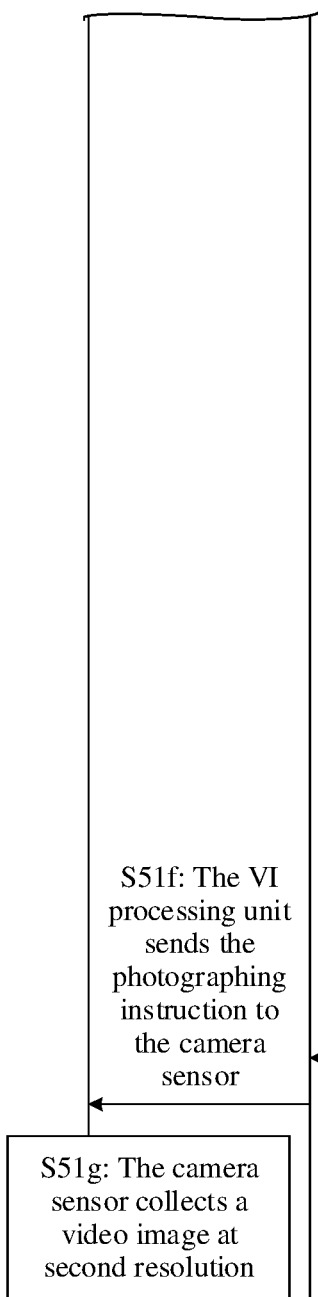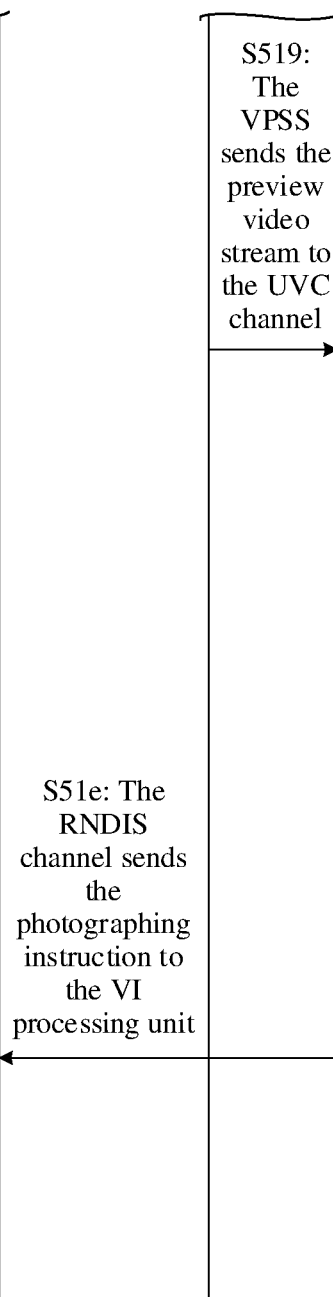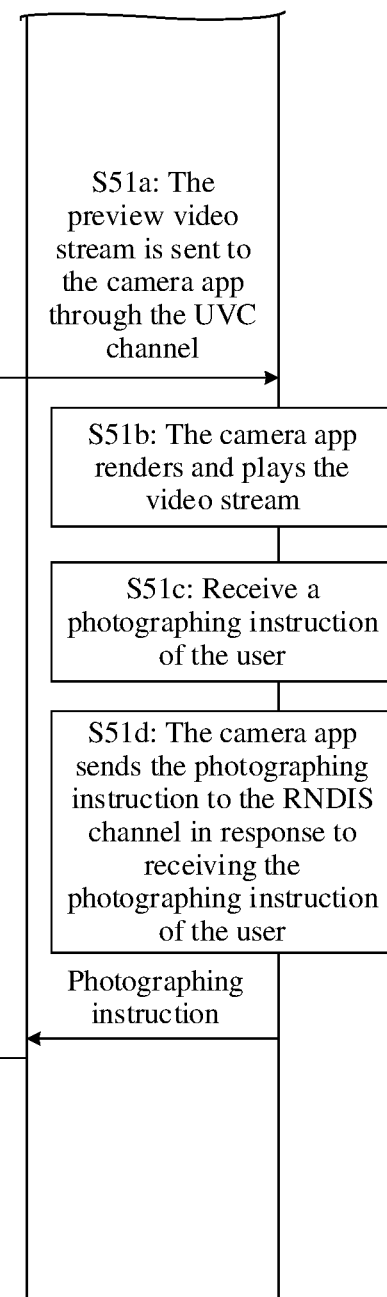
FIG. 5B-2

PHOTOGRAPHING METHOD AND ELECTRONIC DEVICE

CROSS-REFERENCE TO RELATED APPLICATIONS

This application is a national stage of International Application No. PCT/CN2021/105232, filed on Jul. 8, 2021, which claims priority to Chinese Patent Application No. 202010664485.X, filed on Jul. 10, 2020. Both of the aforementioned applications are incorporated herein by reference in their entireties.

TECHNICAL FIELD

This application relates to the field of terminal technologies, and in particular, to a photographing method and an electronic device.

BACKGROUND

With advancement of science and technology, smart screens gradually enter people's lives. A smart screen may also be referred to as a smart television. In addition to watching various television programs and videos on the smart screen, a user may further take photos, shoot videos, and have video calls on the smart screen. Usually, a smart screen includes a camera and a device body with a screen. During photographing, video shooting, a video call, or the like, the camera collects an image and transmits the image to the device body, to present the image to the user on the screen. A single-chip solution used by a mobile phone cannot meet requirements for high-definition decoding and high-quality image processing of the smart screen. Therefore, the smart screen uses a dual-chip architecture. In addition to a master chip, a video processing chip separately used for image processing is further disposed. Usually, the master chip is disposed on the device body, and the video processing chip is disposed on the camera. The video processing chip and the master chip complete data exchange by using a universal serial bus (universal serial bus, USB) channel.

In the conventional technology, a video processing chip and a master chip exchange data by using a USB video class (USB video class, UVC) channel. For example, as shown in FIG. 1, during photographing preview, a video processing chip obtains an image collected by a camera sensor to form a video stream, and transmits the video stream to a master chip through a UVC channel. After rendering the video stream, the master chip may present a photographing preview interface on a display. During photographing, a frame of image is directly captured from the video stream and is saved as a photo. Resolution of the video stream is the same as resolution of the photo. Currently, resolution of a video stream is usually 1920×1080, and maximum resolution of a saved photo is 1920×1080 (2 megapixels), which cannot meet users' requirements for an ultra-high-definition photo. To obtain a 24-megapixel ultra-high-definition photo, resolution of a video stream transmitted through a UVC channel needs to reach at least 5632×4224, but this increases system memory, power consumption, a delay, and the like, and further increases hardware costs or deteriorates user experience.

SUMMARY

Embodiments of this application provide a photographing method and an electronic device. A video stream and a photographing stream are separately transmitted through different USB channels, so that an ultra-high-resolution photo may be obtained and real-time performance and smoothness of the video stream may be fully ensured.

According to a first aspect, an embodiment of this application provides a photographing method, applied to an electronic device, where the electronic device includes a device body and a camera connected to the device body, and the device body includes a display. The method includes: The camera collects a video image, and obtains a video stream with first resolution based on the video image; the camera transmits the video stream to the device body through a first transmission channel; the device body displays the video stream by using the display; the camera obtains a photographing stream with second resolution based on the collected video image in response to a fact that the device body receives a photographing instruction; the camera transmits the photographing stream to the device body through a second transmission channel; and the device body obtains a photo based on the photographing stream. The second resolution is greater than the first resolution, and the second transmission channel is different from the first transmission channel.

In specific implementation, the device body may include a main processor and a display. The camera may include a sensor and a video processor. Specifically, for the foregoing units, the method may include: The sensor collects a video image, and transmits the video image to the video processor; the video processor obtains a video stream with first resolution based on the video image, and transmits the video stream to the main processor through a first transmission channel; the main processor displays the video stream by using the display; in response to a fact that the main processor receives a photographing instruction, the video processor obtains a photographing stream with second resolution based on the video image collected by the camera sensor, and transmits the photographing stream to the main processor through a second transmission channel; and the main processor obtains a photo based on the photographing stream.

In this method, the video stream and the photographing stream are transmitted through different transmission channels, and resolution of the photo is not limited by resolution of a preview video. In this way, a high-resolution ultra-high-definition photo may be obtained and a low-resolution preview video is maintained, to ensure smoothness of the preview video.

With reference to the first aspect, in a possible design manner, that the camera collects a video image, and obtains a video stream with first resolution based on the video image includes: The camera collects a first video image at the second resolution, and processes the first video image to obtain the video stream with the first resolution. That the camera obtains a photographing stream with second resolution based on the collected video image includes: The camera obtains the photographing stream with the second resolution based on the first video image.

In specific implementation, the method may include: The camera sensor collects a first video image at the second resolution, and transmits the first video image to the video processor; the video processor processes the first video image to obtain the video stream with the first resolution; and the video processor further obtains the photographing stream with the second resolution based on the first video image.

In this method, the camera collects the video image at high resolution, and obtains a low-resolution video stream and a high-resolution photographing stream based on the high-resolution video image.

With reference to the first aspect, in a possible design manner, that the camera collects a video image, and obtains a video stream with first resolution based on the video image includes: The camera collects a second video image at the first resolution, and obtains the video stream with the first resolution based on the second video image. That the camera obtains a photographing stream with second resolution based on the collected video image in response to a fact that the device body receives a photographing instruction includes: In response to the fact that the device body receives the photographing instruction, the camera collects a first video image at the second resolution, and obtains the photographing stream with the second resolution based on the first video image.

In specific implementation, the method may include: The camera sensor collects a second video image at the first resolution, and transmits the second video image to the video processor; the video processor obtains the video stream with the first resolution based on the second video image; in response to the fact that the main processor receives the photographing instruction, the camera sensor collects a first video image at the second resolution, and transmits the first video image to the video processor; and the video processor obtains the photographing stream with the second resolution based on the first video image.

In this method, during photographing preview, the camera collects the video image at low resolution, and obtains the low-resolution video stream based on the video image. During photographing, the camera collects the video image at high resolution, and obtains the high-resolution photographing stream based on the video image.

With reference to the first aspect, in a possible design manner, that the camera obtains the photographing stream with the second resolution based on the first video image includes: The camera captures one or more frames of images of the first video image to form the photographing stream. In specific implementation, this step may be completed by the video processor of the camera.

With reference to the first aspect, in a possible design manner, the camera transmits the video stream to the device body through the first transmission channel at a first transmission rate; and the camera transmits the photographing stream to the device body through the second transmission channel at a second transmission rate, where the second transmission rate is less than the first transmission rate. In this way, smoothness of the preview interface may be ensured. In specific implementation, this step may be completed by the video processor of the camera.

With reference to the first aspect, in a possible design manner, the method further includes: The camera obtains an artificial intelligence AI stream with third resolution based on the collected video image, where the third resolution is less than the first resolution; and the camera performs, based on the AI stream, image enhancement processing on the collected video image. In specific implementation, the video image may be collected by the camera sensor. The video processor obtains an AI stream with third resolution based on the video image collected by the camera sensor, and performs, based on the AI stream, image enhancement processing on the video image collected by the camera sensor.

The AI stream with low resolution may be transmitted at a high transmission rate, so that AI computing may be performed quickly, and image enhancement processing may be performed on the video image, to improve an image quality of the preview interface and the photo.

With reference to the first aspect, in a possible design manner, the camera and the device body are connected to each other by using a universal serial bus USB. Specifically, the video processor of the camera is connected to the main processor of the device body by using a universal serial bus USB.

According to a second aspect, an embodiment of this application provides a photographing method, applied to an electronic device. The electronic device includes a display, a camera sensor, a video processor, and a main processor. The method includes: The camera sensor collects a video image, and transmits the video image to the video processor; the video processor obtains a video stream with first resolution based on the video image, and transmits the video stream to the main processor through a first transmission channel; the main processor displays the video stream by using the display; in response to a fact that the main processor receives a photographing instruction, the video processor obtains a photographing stream with second resolution based on the video image collected by the camera sensor, and transmits the photographing stream to the main processor through a second transmission channel; and the main processor obtains a photo based on the photographing stream. The second resolution is greater than the first resolution.

In this method, the video stream and the photographing stream are transmitted through different transmission channels, and resolution of the photo is not limited by resolution of a preview video. In this way, a high-resolution ultra-high-definition photo may be obtained and a low-resolution preview video may be maintained, to ensure smoothness of the preview video.

With reference to the second aspect, in a possible design manner, the camera sensor collects a first video image at the second resolution, and transmits the first video image to the video processor; the video processor processes the first video image to obtain the video stream with the first resolution; and the video processor further obtains the photographing stream with the second resolution based on the first video image. In this method, the camera sensor obtains the video image at high resolution. The video processor obtains a low-resolution video stream and a high-resolution photographing stream based on the high-resolution video image.

With reference to the second aspect, in a possible design manner, the camera sensor collects a second video image at the first resolution; the video processor obtains the video stream with the first resolution based on the second video image; in response to the fact that the main processor receives the photographing instruction, the camera sensor collects the first video image at the second resolution, and transmits the first video image to the video processor; and the video processor obtains the photographing stream with the second resolution based on the first video image. In this method, during photographing preview, the camera sensor collects the video image at low resolution, and the video processor obtains the video stream with low resolution based on the video image. During photographing, the camera collects the video image at high resolution, and the video processor obtains the photographing stream with high resolution based on the video image.

With reference to the second aspect, in a possible design manner, the video processor captures one or more frames of images of the first video image to form the photographing stream.

With reference to the second aspect, in a possible design manner, the video processor transmits the video stream to the main processor through the first transmission channel at a first transmission rate; and the video processor transmits the photographing stream to the main processor through the second transmission channel at a second transmission, where the second transmission rate is less than the first transmission rate. In this way, smoothness of a preview interface may be ensured.

With reference to the second aspect, in a possible design manner, the video processor obtains an artificial intelligence AI stream with third resolution based on the video image collected by the camera sensor, where the third resolution is less than the first resolution; and the video processor performs, based on the AI stream, image enhancement processing on the collected video image. The AI stream with low resolution may be transmitted at a high transmission rate, so that AI computing may be performed quickly, and image enhancement processing may be performed on the video image, to improve an image quality of the preview interface and the photo.

According to a third aspect, an embodiment of this application provides a photographing method. The method may include: An electronic device displays a photographing preview interface at first resolution; and the electronic device obtains a photo with second resolution in response to receiving a photographing instruction from a user. The second resolution is greater than the first resolution. In this method, the resolution of the photo obtained by the electronic device is greater than resolution of a preview video. The low resolution of the preview video may be maintained while the high-definition photo is obtained, to ensure smoothness of the preview video.

With reference to the third aspect, in a possible design manner, the electronic device collects a first video image at the second resolution, and compresses the first video to the first resolution, to obtain a video stream; the electronic device displays the video stream on the photographing preview interface; the electronic device obtains a photographing stream based on the first video image; and the electronic device obtains a photo based on the photographing stream. In this way, the video stream with the first resolution and the photographing stream with the second resolution are obtained.

With reference to the third aspect, in a possible design manner, the electronic device collects a second video image at the first resolution; the electronic device obtains a video stream based on the second video stream; the electronic device displays the video stream on the photographing preview interface; the electronic device collects the first video image at the second resolution in response to receiving the photographing instruction from the user; the electronic device obtains a photographing stream based on the first video image; and the electronic device obtains the photo based on the photographing stream. In this way, the video stream with the first resolution and the photographing stream with the second resolution are obtained.

With reference to the third aspect, in a possible design manner, the electronic device captures one or more frames of images of the first video image to form the photographing stream.

With reference to the third aspect, in a possible design manner, the video stream and the photographing stream are transmitted through different transmission channels. In this way, the video stream and the photographing stream may be transmitted at different resolutions and different transmission rates.

With reference to the third aspect, in a possible design manner, a transmission rate of the video stream is greater than a transmission rate of the photographing stream. This ensures smoothness of the video stream.

With reference to the third aspect, in a possible design manner, the method further includes: The electronic device obtains an artificial intelligence AI stream with third resolution based on the collected video image, where the third resolution is less than the first resolution; and the electronic device performs, based on the AI stream, image enhancement processing on the collected video image. The AI stream with low resolution may be transmitted at a high transmission rate, so that AI computing may be performed quickly, and image enhancement processing may be performed on the video image, to improve an image quality of the preview interface and the photo.

According to a fourth aspect, an embodiment of this application provides an electronic device. The electronic device includes a device body and a camera connected to the device body, and the device body includes a display. The camera is configured to collect a video image, and obtain a video stream with first resolution based on the video image, and is further configured to transmit the video stream to the device body through a first transmission channel. The device body is configured to display the video stream by using the display, and is further configured to receive a photographing instruction. The camera is further configured to obtain a photographing stream with second resolution based on the collected video image in response to a fact that the device body receives the photographing instruction, where the second resolution is greater than the first resolution. The camera is further configured to transmit the photographing stream to the device body through a second transmission channel, where the second transmission channel is different from the first transmission channel. The device body is further configured to obtain a photo based on the photographing stream.

With reference to the fourth aspect, in a possible design manner, the camera is specifically configured to collect a first video image at the second resolution; the camera is further specifically configured to process the first video image to obtain the video stream with the first resolution; and the camera is further specifically configured to obtain the photographing stream with the second resolution based on the first video image.

With reference to the fourth aspect, in a possible design manner, the camera is specifically configured to collect a second video image at the first resolution, and obtain the video stream with the first resolution based on the second video image; and the camera is further specifically configured to: in response to the fact that the device body receives the photographing instruction, collect a first video image at the second resolution, and obtain the photographing stream with the second resolution based on the first video image.

With reference to the fourth aspect, in a possible design manner, that the camera obtains the photographing stream with the second resolution based on the first video image includes: The camera captures one or more frames of images of the first video image to form the photographing stream.

With reference to the fourth aspect, in a possible design manner, the camera is specifically configured to transmit the video stream to the device body through the first transmission channel at a first transmission rate; and the camera is further specifically configured to transmit the photographing stream to the device body through the second transmission channel at a second transmission rate, where the second transmission rate is less than the first transmission rate.

With reference to the fourth aspect, in a possible design manner, the camera is further configured to obtain an artificial intelligence AI stream with third resolution based on the collected video image, and perform image enhancement processing on the collected video image based on the AI stream, where the third resolution is less than the first resolution.

With reference to the fourth aspect, in a possible design manner, the camera and the device body are connected to each other by using a universal serial bus USB.

According to a fifth aspect, an embodiment of this application provides an electronic device. The electronic device includes a display, a camera sensor, a video processor, and a main processor. The camera sensor is configured to collect a video image. The camera sensor is further configured to transmit the video image to the video processor. The video processor is configured to obtain a video stream with first resolution based on the video image, and is further configured to transmit the video stream to the main processor through a first transmission channel. The display is configured to display the video stream. The main processor is further configured to receive a photographing instruction. The video processor is configured to: in response to a fact that the main processor receives the photographing instruction, obtain a photographing stream with second resolution based on the video image collected by the camera sensor, where the second resolution is greater than the first resolution. The video processor is further configured to transmit the photographing stream to the main processor through a second transmission channel. The main processor is further configured to obtain a photo based on the photographing stream. The second transmission channel is different from the first transmission channel.

With reference to the fifth aspect, in a possible design manner, the camera sensor is specifically configured to collect a first video image at the second resolution; the video processor is specifically configured to process the first video image to obtain the video stream with the first resolution; and the video processor is further specifically configured to obtain the photographing stream with the second resolution based on the first video image.

With reference to the fifth aspect, in a possible design manner, the camera sensor is specifically configured to collect a second video image at the first resolution; the video processor is specifically configured to obtain the video stream with the first resolution based on the second video image; the camera sensor is further specifically configured to: in response to the fact that the main processor receives the photographing instruction, collect the first video image at the second resolution, and transmit the first video image to the video processor; and the video processor is specifically configured to obtain the photographing stream with the second resolution based on the first video image.

With reference to the fifth aspect, in a possible design manner, that the video processor obtains the photographing stream with the second resolution based on the first video image specifically includes: The video processor captures one or more frames of images of the first video image to form the photographing stream.

With reference to the fifth aspect, in a possible design manner, the video processor is specifically configured to transmit the video stream to the main processor through the first transmission channel at a first transmission rate; and the video processor is further specifically configured to transmit the photographing stream to the main processor through the second transmission channel at a second transmission, where the second transmission rate is less than the first transmission rate.

With reference to the fifth aspect, in a possible design manner, the video processor is further configured to obtain an artificial intelligence AI stream with third resolution based on the video image collected by the camera sensor, where the third resolution is less than the first resolution; and the video processor is further configured to perform, based on the AI stream, image enhancement processing on the video image collected by the camera sensor.

With reference to the fifth aspect, in a possible design manner, the video processor and the main processor are connected to each other by using a universal serial bus USB.

According to a sixth aspect, an embodiment of this application provides an electronic device. The electronic device may implement the photographing method according to the first aspect, the second aspect, or the third aspect, and the possible designs of the first aspect, the second aspect, or the third aspect. The electronic device may implement the method by using software, hardware, or hardware executing corresponding software. In a possible design, the electronic device may include a processor and a memory. The processor is configured to support the electronic device in performing a corresponding function in the method in the first aspect, the second aspect, or the third aspect. The memory is configured to be coupled to the processor, and store program instructions and data that are necessary for the electronic device.

According to a seventh aspect, an embodiment of this application provides a computer-readable storage medium. The computer-readable storage medium includes computer instructions. When the computer instructions are run on an electronic device, the electronic device is enabled to perform the photographing method according to the first aspect, the second aspect, or the third aspect and the possible designs of the first aspect, the second aspect, or the third aspect.

According to an eighth aspect, an embodiment of this application provides a computer program product. When the computer program product is run on a computer, the computer is enabled to perform the photographing method according to the first aspect, the second aspect, or the third aspect and the possible designs of the first aspect, the second aspect, or the third aspect.

For technical effects brought by the electronic device according to the fourth aspect, the electronic device according to the fifth aspect, the electronic device according to the sixth aspect, the computer-readable storage medium according to the seventh aspect, and the computer program product according to the eighth aspect, refer to technical effects brought by the foregoing corresponding methods. Details are not described herein again.

BRIEF DESCRIPTION OF THE DRAWINGS

FIG. 5A-1 to FIG. 5A-3 are a flowchart 1 of a photographing method according to an embodiment of this application;

FIG. 5B-1 to FIG. 5B-3 are a flowchart 2 of a photographing method according to an embodiment of this application;

DETAILED DESCRIPTION OF ILLUSTRATIVE EMBODIMENTS

A photographing method provided in embodiments of this application may be applied to an electronic device that is transmitted between any camera and a device body based on a USB dual-stack architecture. For example, the electronic device may be a smart screen (which may also be referred to as a big screen or a smart television), a personal computer (person computer, PC), a notebook computer, a smart home appliance, or the like. A specific form of the electronic device 100 is not specifically limited in embodiments of this application.

Figure 2:
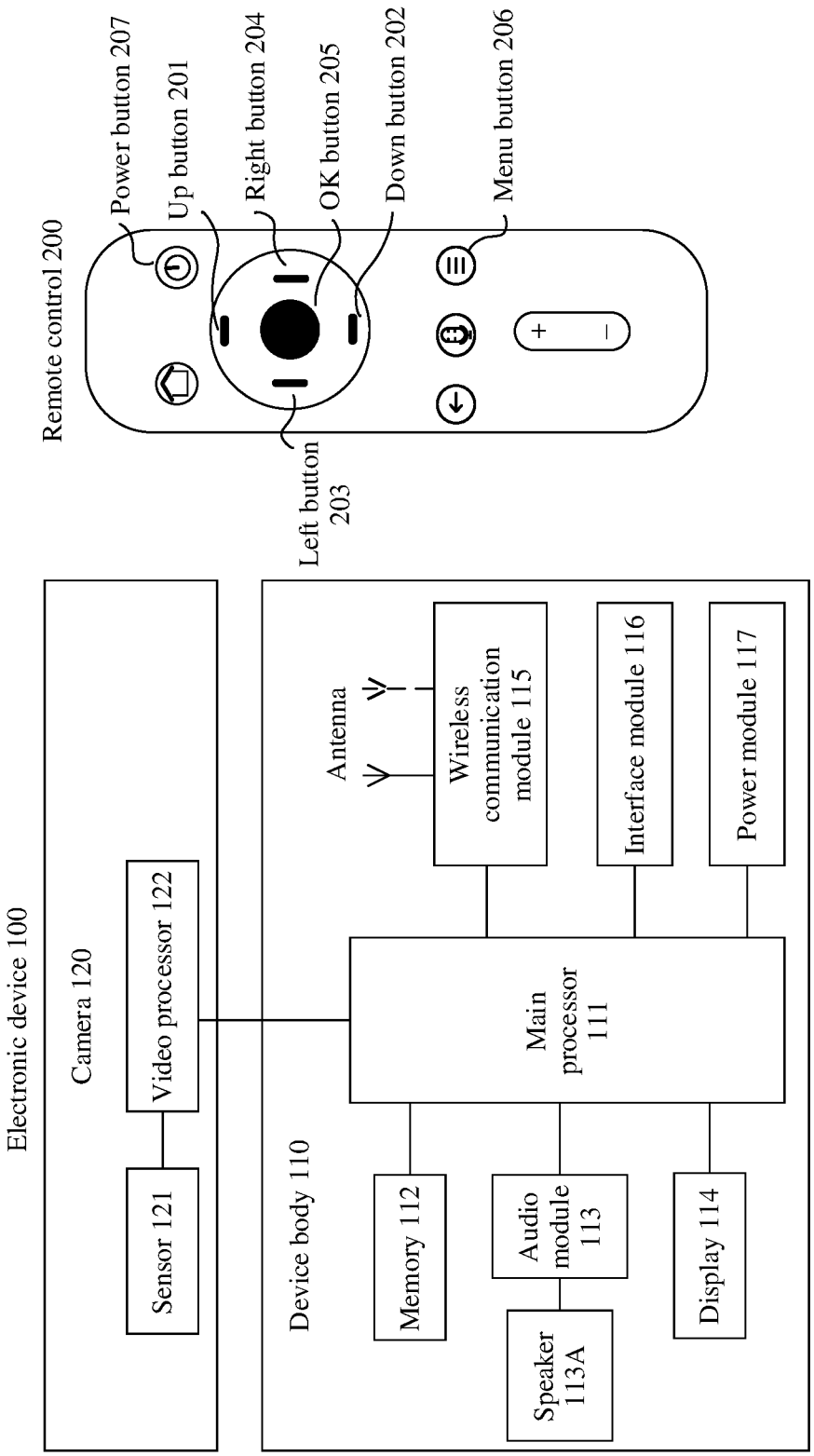
FIG. 2 is a schematic diagram of composition of a hardware structure of an electronic device according to an embodiment of this application.

FIG. 2 is a schematic diagram of a structure of an electronic device 100 according to an embodiment of this application. The electronic device 100 may include a device body 110 and a camera 120. The device body 110 includes a main processor 111, a video processor 122, a memory 112, an audio module 113, a speaker 113A, a display 114, a wireless communication module 115, an interface module 116, a power module 117, a camera 120, and the like. The camera 120 includes a sensor 121 and a video processor 122.

In some embodiments, the camera 120 may pop up. The camera 120 may pop up to separate from the device body 110; alternatively, the camera 120 may fall back into the device body 110. Optionally, the video processor 122 may be located in the camera 120, and may separate from the device body 110 as the camera 120 pops up. Optionally, the video processor 122 may be located in the device body 110, and does not pop up or fall back with the camera 120, that is, the popping up and falling back of the camera 120 is equivalent to the popping up and falling back of the sensor 121.

It may be understood that the structure shown in this embodiment of the present invention does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by using hardware, software, or a combination of software and hardware.

The main processor 111 may include one or more processors. For example, the main processor in may include an application processor, a graphics processing unit (graphics processing unit, GPU), a controller, a video codec, and/or a digital signal processor (digital signal processor, DSP), or the like. Different processors may be independent components, or may be integrated into one or more processors. For example, a function of the main processor 111 may be implemented by an integrated main chip.

The controller may be a nerve center and a command center of the electronic device 100. The controller may generate an operation control signal based on instruction operation code and a time sequence signal, to complete control of instruction fetching and instruction execution.

An operating system of the electronic device 100 may be installed on the application processor, and is configured to manage hardware and software resources of the electronic device 100, for example, manage and configure memory, determine a priority of system resource supply and demand, manage file systems, and manage drivers. The operating system may also be configured to provide an operating interface for a user to interact with the system. Various types of software, such as a driver and an application (application, App), may be installed in the operating system. For example, apps such as "Camera", "Clock", "Fitness", and "Video" may be installed in the operating system.

The digital signal processor is configured to process a digital signal, and may process another digital signal in addition to the digital image signal.

The video codec is configured to compress or decompress a digital video. The electronic device 100 may support one or more video codecs. In this way, the electronic device 100 may play videos of a plurality of encoding formats.

The graphics processing unit is used to perform operations related to images and graphics.

The memory 112 is configured to store instructions and data. In some embodiments, the memory 112 is a cache memory. The memory may store instructions or data just used or cyclically used by the main processor 111. If the main processor 111 needs to use the instructions or the data again, the main processor may directly invoke the instructions or the data from the memory 112. This avoids repeated access, reduces waiting time of the main processor 111, and improves system efficiency.

In some embodiments, the memory 112 may alternatively be disposed in the main processor 111, that is, the main processor 111 includes the memory 112. This is not limited in this embodiment of this application.

The audio module 113 is configured to convert digital audio information into an analog audio signal for output, and is also configured to convert analog audio input into a digital audio signal. The audio module 113 may be further configured to code and decode an audio signal. In some embodiments, the audio module 113 may be disposed in the main processor 111, or some functional modules in the audio module 113 are disposed in the main processor 111.

The speaker 113A, also referred to as a "loudspeaker", is configured to convert an audio electrical signal into a sound signal.

The electronic device 100 may implement an audio function by using the audio module 113, the speaker 113A, the application processor, and the like, for example, sound play.

The electronic device 100 may implement a display function through the GPU, the display 114, the application processor, and the like. The GPU is a microprocessor for image processing, and is connected to the display 114 and the application processor. The GPU is configured to perform mathematical and geometric computation, and render an image. The main processor 111 may include one or more GPUs, which execute program instructions to generate or change display information.

The display 114 is configured to display an image, a video, and the like. The display 114 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diodes, QLED), or the like. In this embodiment of this application, the display 114 may be configured to display an app interface, a photographing preview interface, a photo, and the like.

The electronic device 100 may implement a photographing function by using video processor 122, the camera 120, the video codec, the GPU, the display 114, the application processor, and the like.

The wireless communication module 115 may provide a solution that is applied to the electronic device 100 and that includes wireless communication such as a wireless local area network (wireless local area network, WLAN) (for example, a wireless fidelity (wireless fidelity, Wi-Fi) network), Bluetooth (Bluetooth, BT), frequency modulation (frequency modulation, FM), and an infrared (infrared, IR) technology. The wireless communication module 115 may be one or more components integrating at least one communication processing module. The wireless communication module 115 receives an electromagnetic wave through an antenna, performs frequency modulation and filtering processing on an electromagnetic wave signal, and sends a processed signal to the main processor 111.

The interface module 116 may include a network cable interface, a USB interface, an audio output interface, a high definition multimedia interface (high definition multimedia interface, HDMI), a memory card interface, and the like. A network cable can be inserted into the network cable interface. One end of the network cable is inserted into the network cable interface of the electronic device 100, and the other end is inserted into a wired network interface, that is, the electronic device 100 accesses the wired network. The USB interface is an interface that conforms to a USB standard specification, and may be specifically a mini USB interface, a micro USB interface, a USB type-C interface, or the like. The USB interface may be configured to transmit data between the electronic device 100 and a peripheral device. For example, the electronic device 100 may be connected to an external storage device, an external camera, a game console, and the like through the USB interface. The audio output interface of the device is configured to connect to an external audio device, for example, to connect to a speaker. The HDMI is an all-digital video and sound sending interface, and may simultaneously send uncompressed audio and video signals. For example, the electronic device 100 may be connected to a device, for example, a wired set-top box, a network set-top box, or a speaker through the HDMI interface. The memory card interface is configured to connect to an external memory card, for example, a microSD card, to expand a storage capability of the electronic device 100.

The power module 117 may be configured to supply power to each component included in the electronic device 100.

The camera 120 may be configured to capture a static image or a video. An optical image of an object is generated through a lens, and is projected onto the sensor 121. The sensor 121 may be a charge coupled device (charge coupled device, CCD) or a complementary metal-oxide-semiconductor (complementary metal-oxide-semiconductor, CMOS) phototransistor. The sensor 121 converts an optical signal into an electrical signal, and then transmits the electrical signal to the video processor 122 to convert the electrical signal into a digital image signal. The video processor 122 outputs the digital image signal to the DSP for processing. The DSP converts the digital image signal into an image signal in a standard format such as RGB or YUV. The video processor 122 is configured to process data fed back by the sensor 121. For example, during photographing, a shutter is pressed, and light is transmitted to the sensor 121 through a lens. An optical signal is converted into an electrical signal, and the sensor 121 transmits the electrical signal to the video processor 122 for processing, to convert the electrical signal into a visible image. The video processor 122 may further perform algorithm optimization on noise, brightness, and complexion of the image. The video processor 122 may further optimize parameters such as exposure and a color temperature of a photographing scenario.

Usually, the electronic device 100 is equipped with a remote control. The remote control is used to control the electronic device 100. For example, as shown in FIG. 2, the remote control 200 may include a plurality of buttons, for example, an up button 201, a down button 202, a left button 203, a right button 204, an OK button 205, a menu button 206, and a power button 207. The button on the remote control 200 may be a mechanical button or a touch button. The remote control 200 may receive a button input, generate a button signal input related to user settings and function control of the electronic device 100, and send corresponding signals to the electronic device 100 to control the electronic device 100. For example, when a user presses the up button 201, the down button 202, the left button 203, the right button 204, the OK button 205, the menu button 206, or the power button 207, the button may send a corresponding signal, and send a signal to the electronic device 100 in a manner such as Bluetooth or infrared. If the electronic device 100 receives, by using the wireless communication module 115 (for example, Bluetooth or IR), a signal corresponding to a button, the electronic device 100 may perform a corresponding operation based on the signal. For example, when the electronic device 100 receives a signal corresponding to the up button 201, a focus of a display interface of the electronic device 100 may be triggered to move upward. When the electronic device 100 receives a signal corresponding to the down button 202, a focus of a display interface of the electronic device 100 may be triggered to move downward. When the electronic device 100 receives a signal corresponding to the left button 203, a focus of a display interface of the electronic device 100 may be triggered to move leftward. When the electronic device 100 receives a signal corresponding to the right button 204, a focus of a display interface of the electronic device 100 may be triggered to move rightward. When the electronic device 100 receives a signal corresponding to the OK button 205, a focus of a display interface of the electronic device 100 may be triggered to be selected. When the electronic device 100 receives a signal corresponding to the menu button 206, the electronic device 100 may be triggered to display a menu page (for example, display a home camera setting interface). When the electronic device 100 receives a signal corresponding to the power button 207, the electronic device 100 may be triggered to be powered on or powered off.

It may be understood that the remote control 200 may further include another button and component, such as a home button, a volume button, a back button, a Bluetooth interface, an infrared interface, and a battery storage cavity (used to install a battery and supply power to the remote control). Details are not described in this embodiment of this application.

Figure 3:
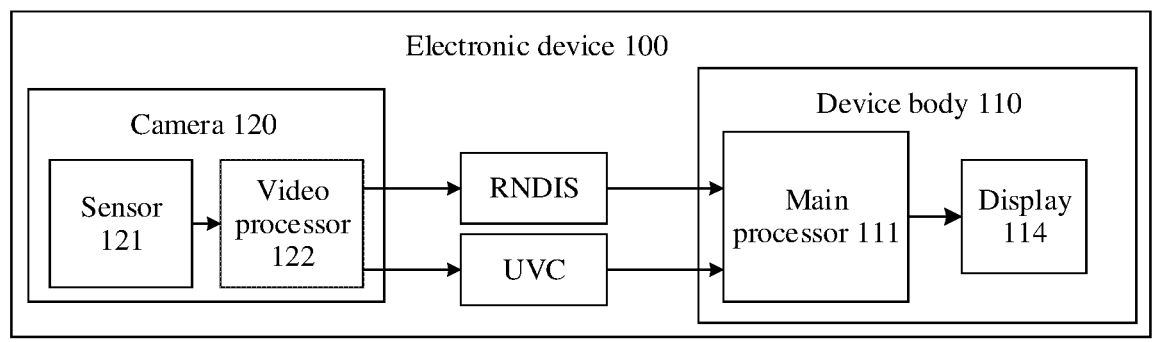
FIG. 3 is a schematic diagram 1 of a photographing method according to an embodiment of this application.

In some embodiments, the camera 120 is connected to the device body 110 through a USB interface. In an example, the video processor 122 of the camera 120 and the main processor 11 of the device body 110 are connected through a USB interface. In some embodiments, as shown in FIG. 3, a USB transmission channel between the video processor 122 and the main processor in adopts a dual-stack architecture. For example, there are two transmission channels between the video processor 122 and the main processor 111. One transmission channel is based on a UVC protocol and the other transmission channel is based on a remote network driver interface specification (remote network driver interface specification, RNDIS). In an implementation, during photographing preview, the camera 120 transmits a preview video stream to the main processor 111 through a first transmission channel (for example, a UVC channel) for rendering. During photographing, a photographing stream is transmitted to the main processor in through a second transmission channel (for example, an RNDIS channel) for storage. For example, the UVC channel transmits a video stream with low resolution, to reduce a delay, and obtain better real-time experience. The RNDIS channel transmits a photographing stream with high resolution, to obtain a photo with a high pixel.

According to the photographing method provided in this embodiment of this application, a video stream and a photographing stream are transmitted through different transmission channels at the USB interface. In this way, the video stream may be transmitted at low resolution and a high transmission rate, and the photographing stream may be transmitted at high resolution and a low transmission rate. Under a condition of not increasing hardware costs, an ultra-high definition photo can be obtained with low memory and power consumption, without affecting a frame rate and real-time performance of the video stream.

Figure 4:
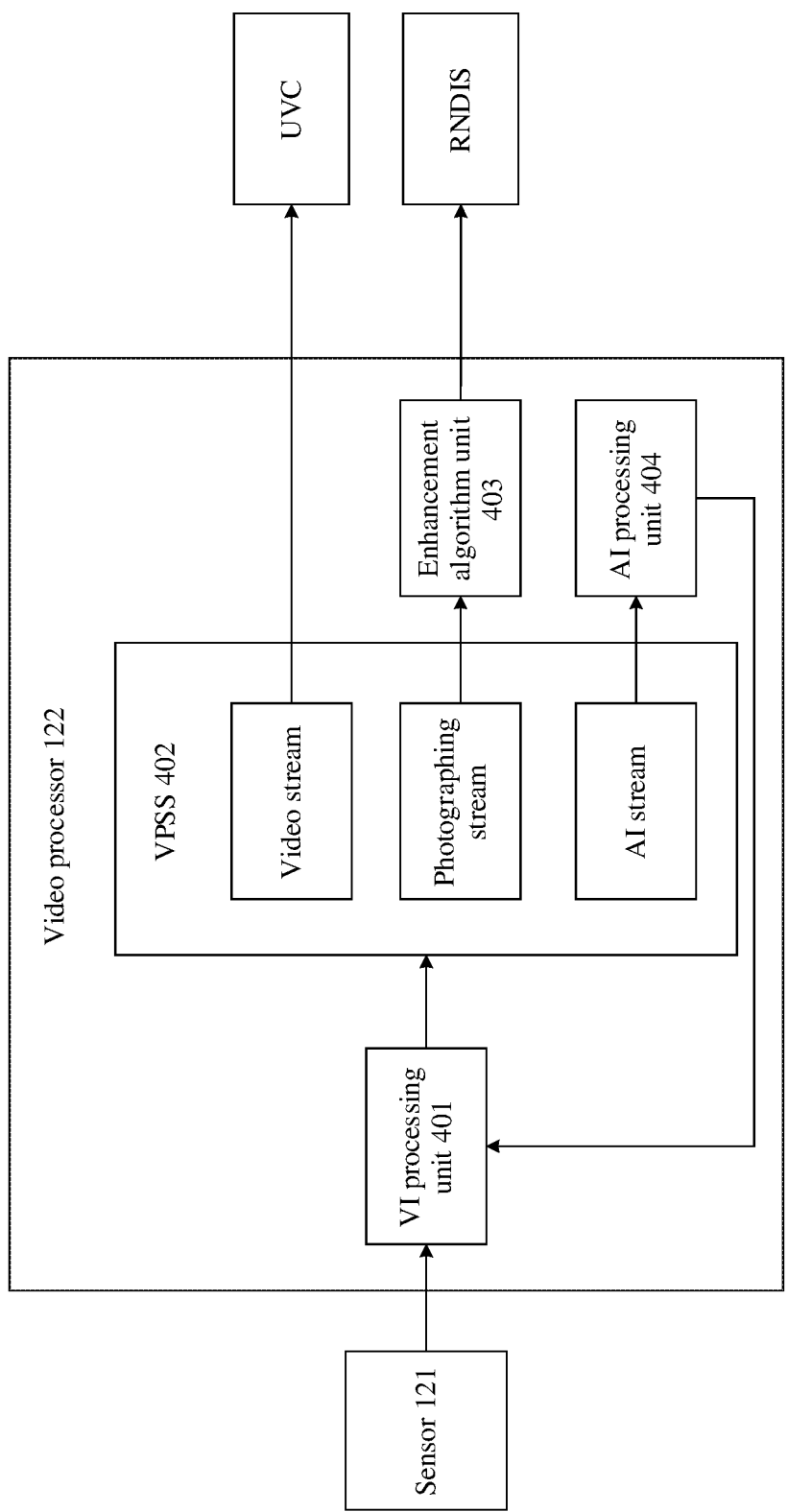
FIG. 4 is a schematic diagram 2 of a photographing method according to an embodiment of this application.

In some embodiments, as shown in FIG. 4, the video processor 122 includes a video input (video input, VI) processing unit 401, a video processing subsystem (video process subsystem, VPSS) 402, an enhancement algorithm unit 403, and an artificial intelligence (artificial intelligence, AI) processing unit 404.

The camera sensor 121 collects a video image to form preview image data. The VI processing unit 401 preprocesses the preview image data to obtain a preview video stream. For example, the preprocessing may include processing such as filtering and noise reduction, target enhancement, and image segmentation.

The VPSS 402 obtains a video stream and a photographing stream based on the preview video stream. Optionally, an AI stream may be further obtained based on the preview video stream. The video stream is used for photographing preview. The photographing stream is used to obtain a photo. The AI stream is used for artificial intelligence computing, such as facial recognition. For example, the electronic device may perform facial recognition based on the AI stream, and then perform skin beautification, facial beautification, or other image processing on a face in the video stream based on a result of the facial recognition. Resolution and a transmission rate of the video stream, photographing stream, and AI stream are separately configured by the VPSS 402. In an example, the video stream uses the first resolution and the first transmission rate, the photographing stream uses the second resolution and the second transmission rate, and the AI stream uses the third resolution and the third transmission rate. In an implementation, the first resolution is less than the second resolution and greater than the third resolution, and the first transmission rate is equal to the third transmission rate and greater than the second transmission rate. For example, the first resolution is 2560×1920, and the first transmission rate is 30 fps (frames per second, frames per second); the second resolution is 5632×4224, and the second transmission rate is 2 fps; and the third resolution is 1920×1080, and the third transmission rate is 30 fps.

In an implementation, during photographing preview, the camera sensor collects a video image at second resolution, to obtain a preview video stream. The VPSS 402 compresses resolution of the preview video stream to first resolution to form a video stream, encodes the video stream by using a video coding method, and sends the video stream to the main processor through a first transmission channel (for example, a UVC channel) at a first transmission rate. The main processor renders the decoded video stream to complete photographing preview. For example, the video encoding method may include H265, H264, and the like. In this way, the video stream is transmitted at low resolution and a high transmission rate, to ensure clarity and smoothness of the video stream.

In an implementation, during photographing, the VPSS 402 captures one or more frames of images in the preview video stream to form a photographing stream. The enhancement algorithm unit 403 performs image enhancement processing on the photographing stream by using an image enhancement algorithm, encodes the photographing stream obtained after image enhancement processing by using an image coding method, and sends the photographing stream to the main processor through a second transmission channel (for example, an RNDIS channel) at a second transmission rate. The main processor stores the decoded photographing stream to complete photographing. For example, the image enhancement algorithm may include a histogram equalization algorithm, a grayscale transformation algorithm, an image smoothing algorithm, an image sharpening algorithm, and the like. The image encoding method may include MJPEG (motion joint photographic experts group), JPEG (joint photographic experts group), and the like. In this way, high resolution is used for the photographing stream, so that an ultra-high definition photo can be obtained. In addition, a photographing stream is only obtained during photographing, to save memory and reduce power consumption.

In an implementation, the VPSS 402 captures one or more frames of images of the preview video stream, and compresses resolution of the image to the third resolution to form the AI stream. The AI processing unit 404 performs AI processing (for example, facial recognition) based on the AI stream. In an implementation, the VI processing unit 401 preprocesses the preview image data based on a calculation result of the AI processing unit 404. For example, the VI processing unit 401 adjusts overall exposure of the image based on the face data calculated by the AI processing unit 404, to improve luminance of a face. Preprocessing the preview image data based on the calculation result of the AI processing unit 404 improves an impression of the preview video and the photo, and improves user experience. The AI stream is transmitted at low resolution and a high transmission rate, so that an AI computing speed and real-time performance can be improved.

The following describes in detail a photographing method and an electronic device provided in embodiments of this application with reference to accompanying drawings.

Figure 1:
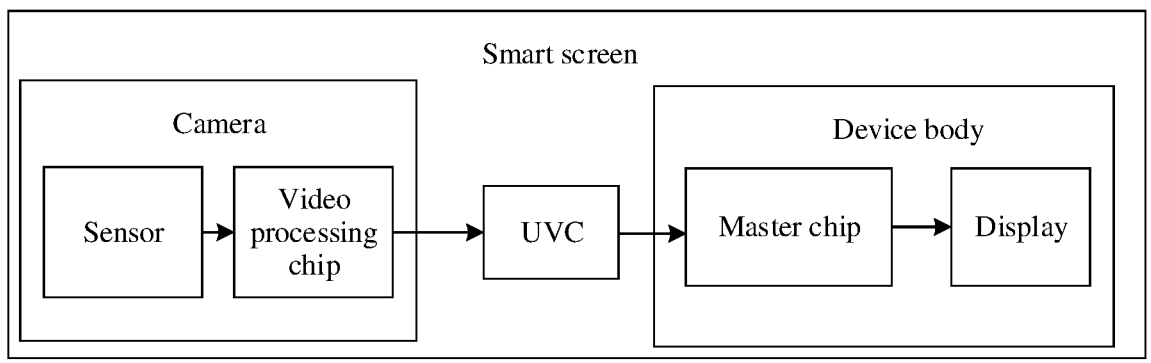
FIG. 1 is a schematic diagram of a photographing method in the conventional technology.
Figures 1, 5A:
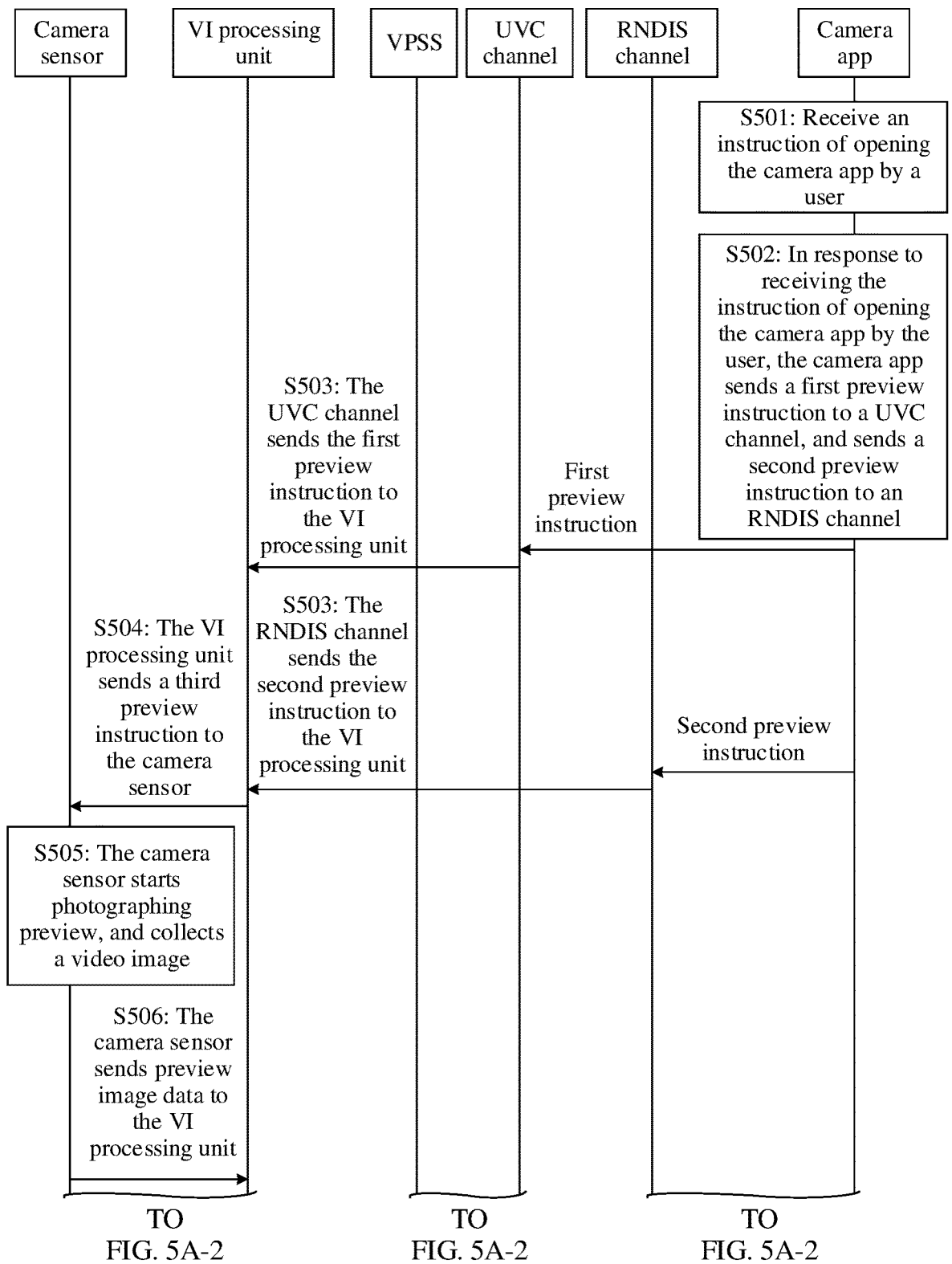
Figures 2, 5A:
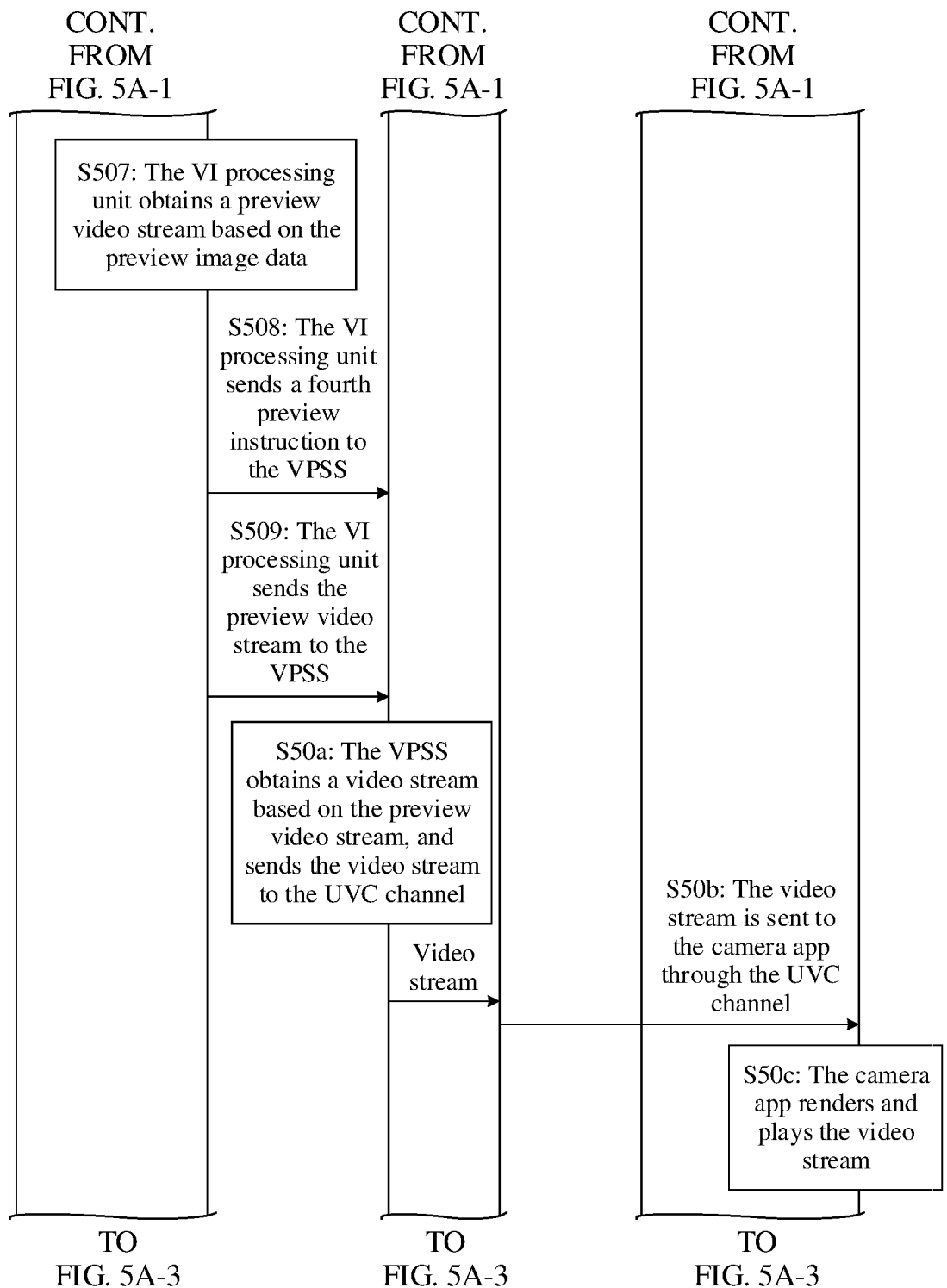
Figures 3, 5A:
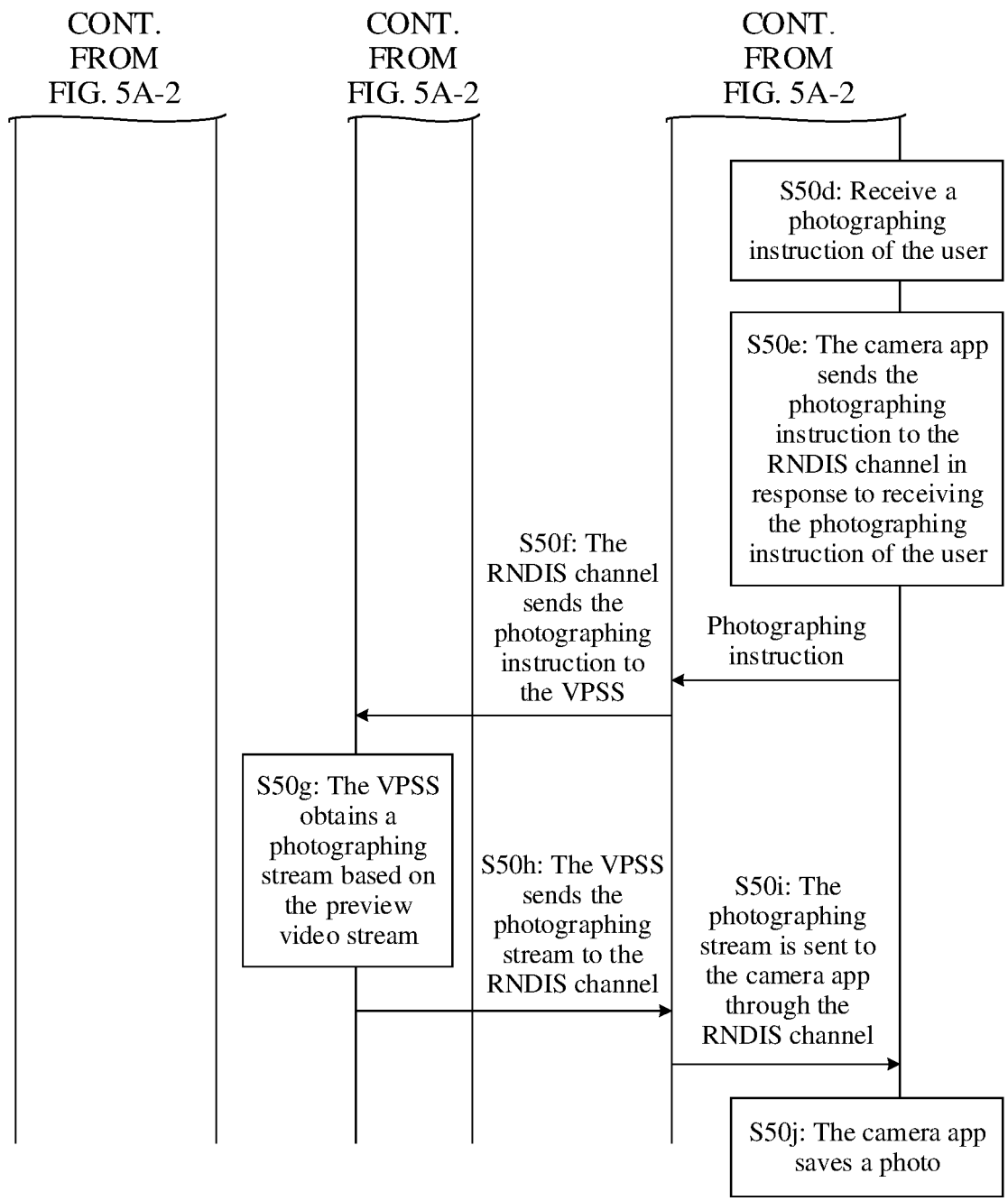

An embodiment of this application provides a photographing method. As shown in FIG. 5A-1 to FIG. 5A-3, the method may include the following steps.

S501: Receive an instruction of opening a camera app by a user.

Figure 6A:
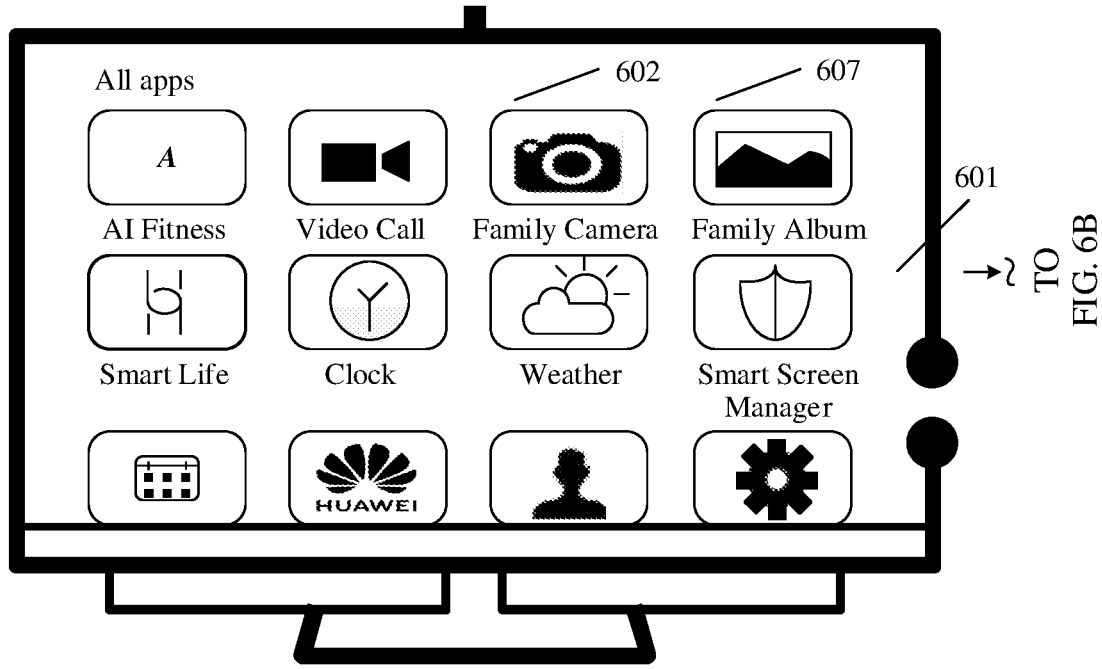
FIG. 6A and FIG. 6B are a schematic diagram 1 of an example of a display interface of an electronic device according to an embodiment of this application.
Figure 6B:
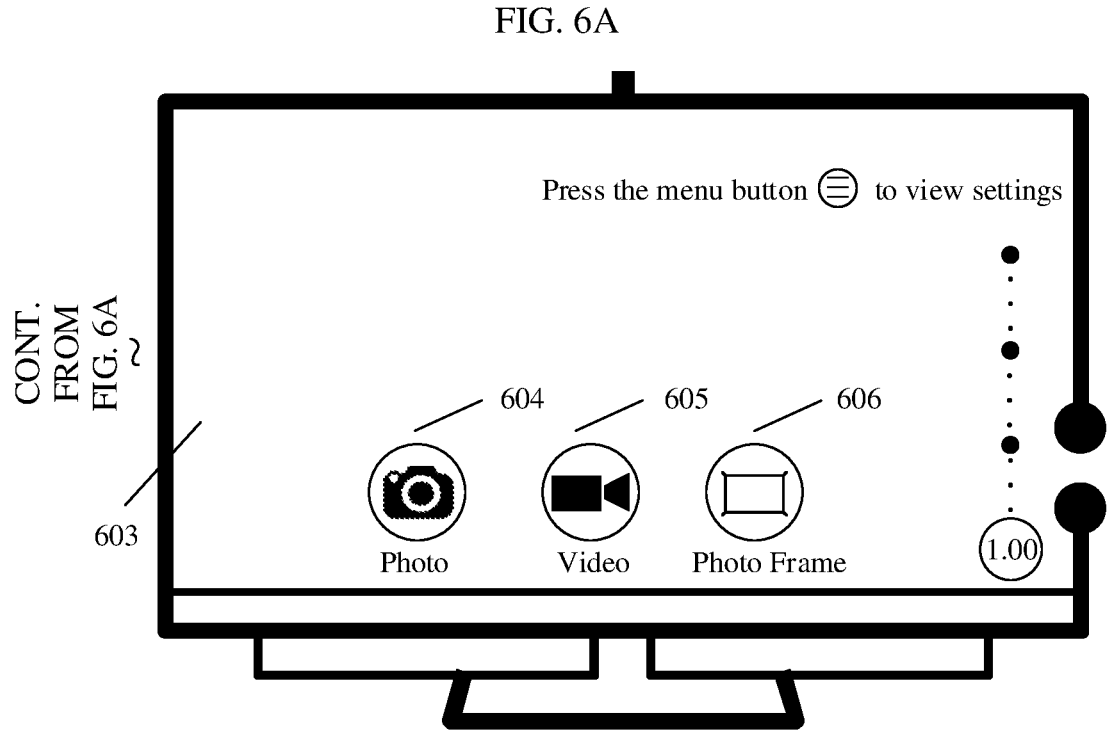

In an implementation, an electronic device (for example, a smart screen) receives an operation of opening a camera app by a user. For example, the user opens a "Family Camera" app of the smart screen. As shown in FIG. 6A and FIG. 6B, the smart screen displays an "All apps" interface 601. The "All apps" interface 601 includes a "Family Camera" icon 602, and the user may select the "Family Camera" icon 602 to open the "Family Camera" app. The smart screen may receive a selection operation performed by the user on the "Family Camera" icon 602. That the smart screen receives the selection operation performed by the user on the "Family Camera" icon 602 means receiving the operation of opening the camera app by the user.

In an example, the smart screen displays the "All apps" interface 601, and a focus is on a first icon "AI Fitness". The user may move the focus rightward by pressing a right button (for example, the right button 204 shown in FIG. 2) of a remote control (for example, the remote control 200 shown in FIG. 2). When the focus is on the "Family Camera" icon 602, the user presses an OK button (for example, the OK button 205 shown in FIG. 2) of the remote control (for example, the remote control 200 shown in FIG. 2). The smart screen receives, by using the wireless communication module 115 (for example, Bluetooth), a signal corresponding to the OK button 205, that is, receives the selection operation performed by the user on the "Family Camera" icon 602.

In response to receiving the selection operation performed by the user on the "Family Camera" icon 602, the smart screen displays a "Photographing Preview" interface 603. The "Photographing Preview" interface 603 may include but is not limited to a "Photo" option 604, a "Video" option 605, a "Photo Frame" option 606, and the like. The "Photo" option 604 is used to start photographing, the "Video" option 605 is used to start video recording, and the "Photo Frame" option 606 is used to switch between photo frames.

In an example, the "All apps" interface 601 further includes a "Family Album" icon 607. The user may select the "Family Album" icon 607 to open a family album, and view a photo saved in the smart screen. For example, the user selects the "Photo" option 604 to start photographing, and the smart screen takes a photo and saves the photo. The user may open the family album to view the taken photo.

It should be noted that in this embodiment of this application, an example in which the remote control controls the smart screen is used for description. It may be understood that, in this embodiment of this application, the electronic device may be controlled in another manner. For example, a mobile phone app may be used to open the camera app of the electronic device, to start photographing, and move a focus on a display. Alternatively, the camera app of the electronic device may be opened through voice control to start photographing, and the like. A specific manner of controlling the electronic device (for example, opening the camera app and starting photographing) is not limited in this embodiment of this application.

S502: In response to receiving the instruction of opening the camera app by the user, the camera app sends a first preview instruction to a UVC channel, and sends a second preview instruction to an RNDIS channel.

In an implementation, the camera app sends the first preview instruction to the UVC channel in response to receiving the operation of opening the camera app by the user, where the first preview instruction is used to instruct to start photographing preview. In an implementation, the first preview instruction includes first resolution. The camera app sends the second preview instruction to the RNDIS channel, where the second preview instruction is used to instruct to start photographing preview. In an implementation, the second preview instruction includes second resolution. It may be understood that the camera app is installed in an operating system of a main processor. That the camera app sends the first preview instruction to the UVC channel means that the main processor sends the first preview instruction to the UVC channel. That the camera app sends the second preview instruction to the RNDIS channel means that the main processor sends the second preview instruction to the RNDIS channel.

In an implementation, the first resolution and the second resolution are default values. For example, the first resolution is a first default value (for example, 2560×1440), and the second resolution is a second default value (for example, 5632×3168).

Figure 7A:
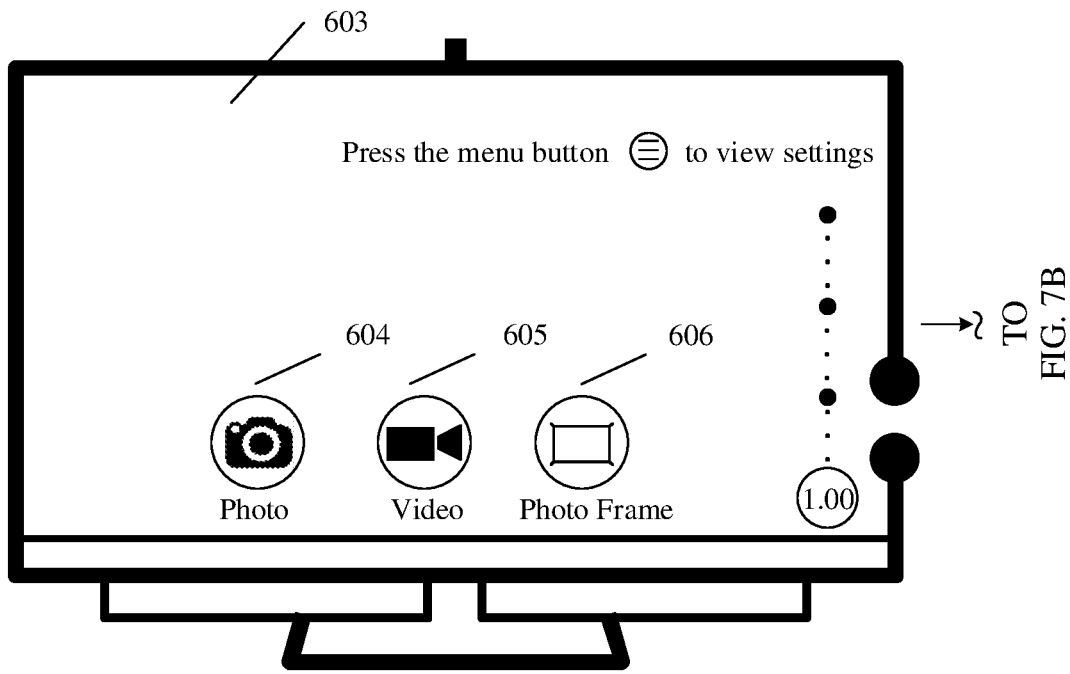
FIG. 7A to FIG. 7C are a schematic diagram 2 of an example of a display interface of an electronic device according to an embodiment of this application.
Figure 7B:
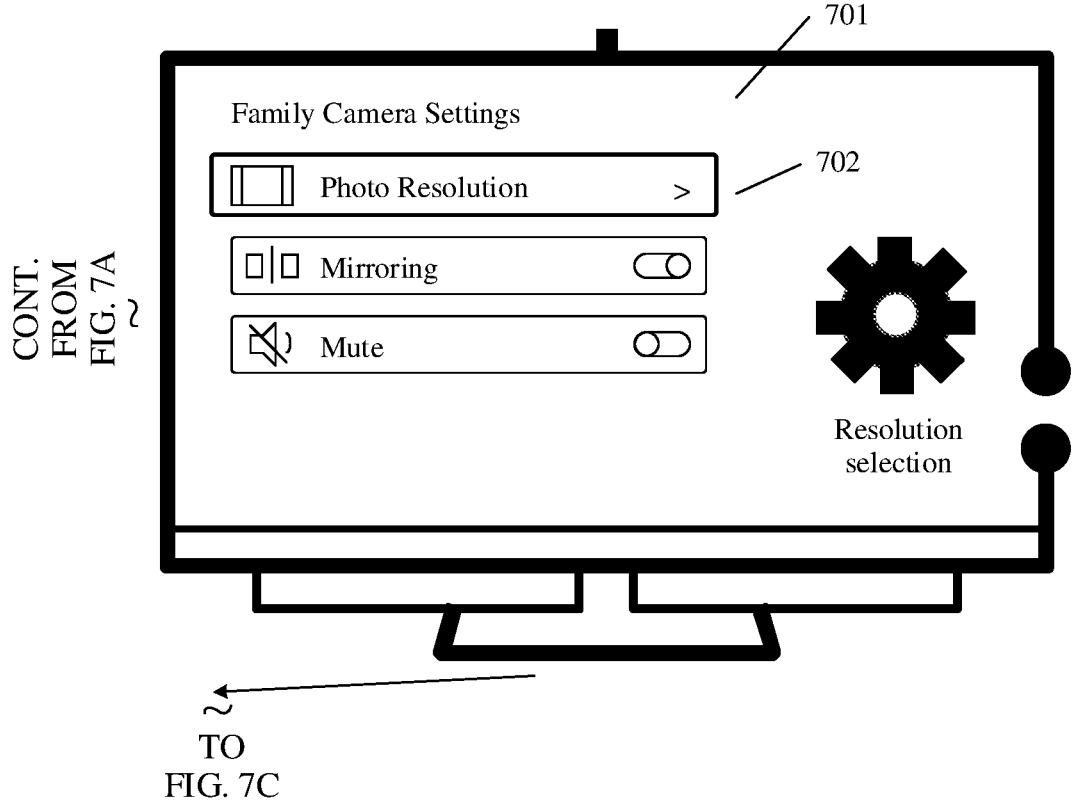
Figure 7C:
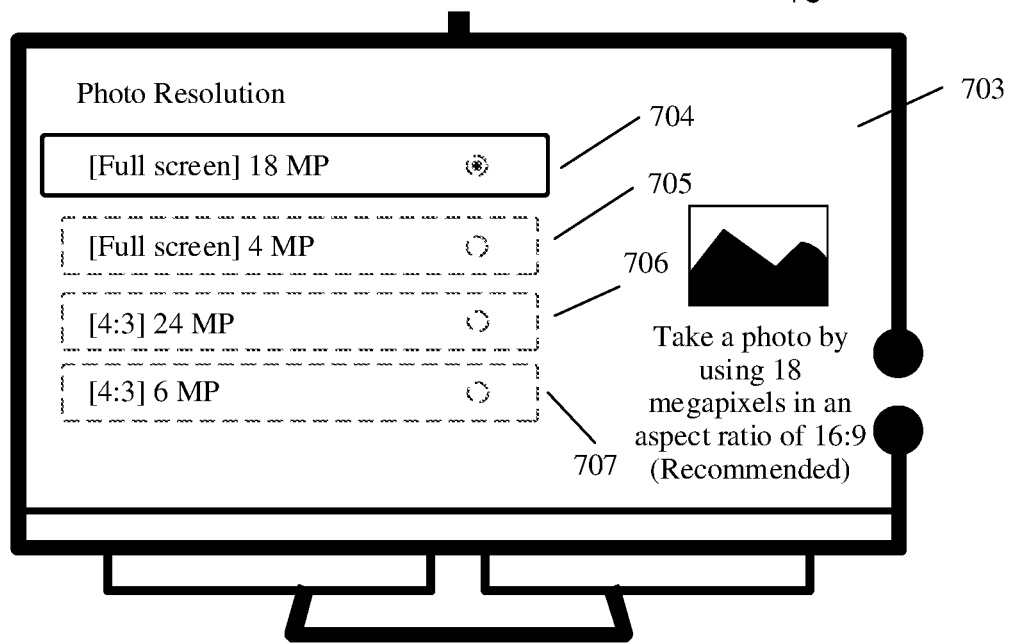

In an implementation, values of the first resolution and the second resolution may be modified based on a selection by the user. In an example, as shown in FIG. 7A to FIG. 7C, the smart screen displays the "Photographing Preview" interface 603. In this interface, a signal corresponding to pressing a menu button (for example, the menu button 206 shown in FIG. 2) of the remote control (for example, the remote control 200 shown in FIG. 2) by the user is received. The smart screen displays a "Family Camera Settings" interface 701 in response to receiving the signal corresponding to the menu button. The "Family Camera Settings" interface 701 may include a "Photo Resolution" option 702, where the "Photo Resolution" option 702 is used to set resolution of taking a photo by the camera. The smart screen may receive a selection operation performed by the user on the "Photo Resolution" option 702, and display a "Photo Resolution" interface 703 in response to the selection operation performed by the user on the "Photo Resolution" option 702. The "Photo Resolution" interface 703 may include a plurality of resolution options. For example, the "Photo Resolution" interface 703 may include an "18 MP" option 704, a "4 MP" option 705, a "24 MP" option 706, and a "6 MP" option 707, which correspond to 18 megapixels, 4 megapixels, 24 megapixels, and 6 megapixels respectively. In an example, a default option of the smart screen is the "18 MP" option 704, which indicates that a photo is taken by using 18 megapixels in an aspect ratio of 16:9. Corresponding second resolution is 5632×3168, and corresponding first resolution may be 2560×1440. For example, the smart screen receives a selection operation performed by the user on the "24 MP" option 706, where the "24 MP" option indicates that a photo is taken by using 24 megapixels in an aspect ratio of 4:3, and corresponding second resolution is 5632×4224. In response to receiving the selection operation of the user on the "24 MP" option 706, the smart screen determines that the second resolution is 5632×4224. The smart screen determines a value of the first resolution, and the first resolution is less than the second resolution. For example, the first resolution may be 2560×1980.

S503: The UVC channel sends the first preview instruction to a VI processing unit, and the RNDIS channel sends the second preview instruction to the VI processing unit.

S504: The VI processing unit sends a third preview instruction to a camera sensor.

The VI processing unit receives the first preview instruction, and obtains the first resolution based on the first preview instruction; and the VI processing unit receives the second preview instruction, and obtains the second resolution based on the second preview instruction.

The VI processing unit sends the third preview instruction to the camera sensor, where the third preview instruction is used to instruct to start photographing preview. In an implementation, the third preview instruction includes the second resolution.

S505: The camera sensor starts photographing preview, and collects a video image.

The camera sensor receives the third preview instruction, and starts photographing preview. In an implementation, the camera sensor collects the video image at the second resolution to form preview image data.

S506: The camera sensor sends the preview image data to the VI processing unit.

S507: The VI processing unit obtains a preview video stream based on the preview image data.

The VI processing unit receives the preview image data, and preprocesses the preview image data to obtain the preview video stream. For example, the VI processing unit may perform processing such as filtering and noise reduction, target enhancement, and image segmentation on the preview image data. For example, the VI processing unit adjusts overall exposure of the preview image data based on face data calculated by an AI processing unit, to improve luminance of a face in the image.

S508: The VI processing unit sends a fourth preview instruction to a VPSS.

The fourth preview instruction is used to instruct to start photographing preview. In an implementation, the fourth preview instruction includes the first resolution and the second resolution.

S509: The VI processing unit sends the preview video stream to the VPSS.

S50a: The VPSS obtains a video stream based on the preview video stream, and sends the video stream to the UVC channel.

In an implementation, the VPSS receives the preview video stream, and resolution of the preview video stream is the second resolution. The VPSS compresses the resolution of the preview video stream to the first resolution, to form the video stream, and sends the video stream to the UVC channel.

S50b: The video stream is sent to the camera app through the UVC channel.

Resolution of the video stream is the first resolution. In an implementation, the video stream is sent to the camera app through the UVC channel at a first transmission rate.

S50c: The camera app renders and plays the video stream.

The camera app receives the video stream, and the main processor renders the video stream. The main processor plays the rendered video stream by using the display, that is, displays a photographing preview interface. Resolution of the photographing preview interface is the first resolution.

S50d: Receive a photographing instruction of the user.

In an implementation, the smart screen receives a photographing operation of the user. For example, the smart screen displays the "Photographing Preview" interface 603 shown in FIG. 6A and FIG. 6B. The "Photographing Preview" interface 603 includes the "Photo" option 604, and the user may select the "Photo" option 604 to start photographing. The smart screen may receive the selection operation performed by the user on the "Photo" option 604. That the smart screen receives the selection operation performed by the user on the "Photo" option 604 means receiving the photographing operation of the user.

It may be understood that the user may further send the photographing instruction in a manner such as a mobile phone app, a voice, or the like. This is not limited in this embodiment of this application.

S50e: The camera app sends the photographing instruction to the RNDIS channel in response to receiving the photographing instruction of the user.

In an implementation, the camera app (the main processor) sends the photographing instruction to the RNDIS channel in response to receiving the photographing operation of the user. In an implementation, the photographing instruction includes the second resolution.

S50f: The RNDIS channel sends the photographing instruction to the VPSS.

S50g: The VPSS obtains a photographing stream based on the preview video stream.

After receiving the photographing instruction, the VPSS captures one or more frames of images of the preview video stream to form the photographing stream. Resolution of the preview video stream and resolution of the photographing stream are the second resolution. It may be understood that, the camera sensor continuously collects images during preview, to form the preview video stream. After receiving the photographing instruction, the VPSS captures one or more frames of images of the current preview video stream to form the photographing stream.

S50h: The VPSS sends the photographing stream to the RNDIS channel.

In an implementation, after image enhancement processing is performed on the photographing stream obtained by the VPSS, the photographing stream is sent to the RNDIS channel.

S50i: The photographing stream is sent to the camera app through the RNDIS channel.

The photographing stream is sent to the camera app through the RNDIS channel at a second transmission rate.

S50j: The camera app saves a photo.

The camera app receives the photographing stream and saves the photographing stream as a photo. Resolution of the photo is the second resolution. For example, the user may open a family album to view the saved photo.

It should be noted that a sequence of the foregoing steps is not limited in this embodiment of this application. For example, the VI processing unit may first perform S504 to send the third instruction to the camera sensor, and then perform S508 to send the fourth instruction to the VPSS. Alternatively, the VI processing unit may first perform S508 to send the fourth instruction to the VPSS, and then perform S504 to send the third instruction to the camera sensor. A sequence of the foregoing steps does not affect an effect of this embodiment of this application.

An embodiment of this application provides a photographing method. After collecting an image based on high resolution of a photo, a camera transmits a video stream to a main processor through a first transmission channel at low resolution and a high transmission rate, and transmits a photographing stream to the main processor through a second transmission channel at high resolution and a low transmission rate. Resolution of the photo is not limited by resolution of a preview video. In this way, an ultra-high-definition photo can be obtained and a clear and smooth preview video can be ensured.

Figures 1, 5B:
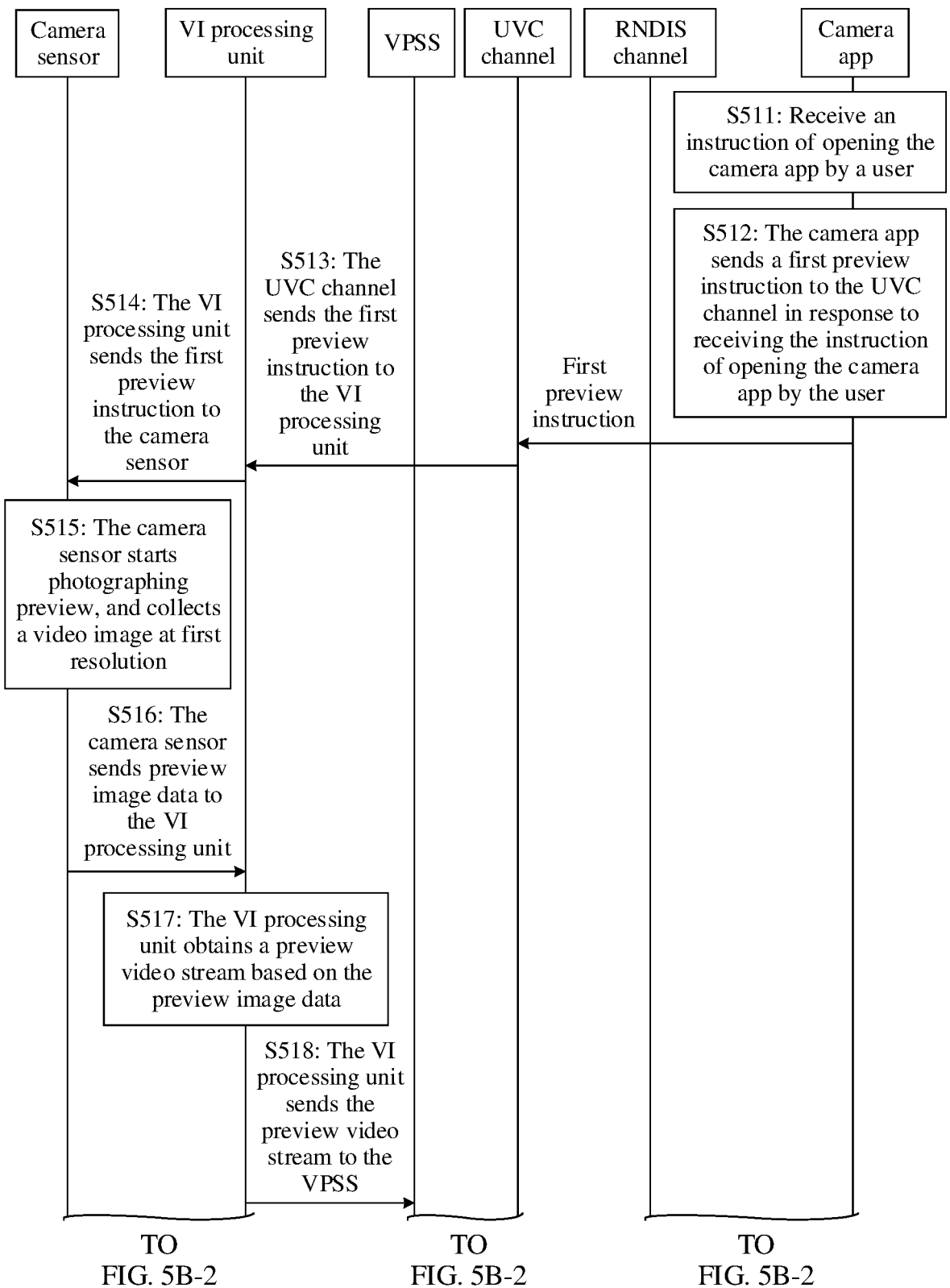
Figures 3, 5B:
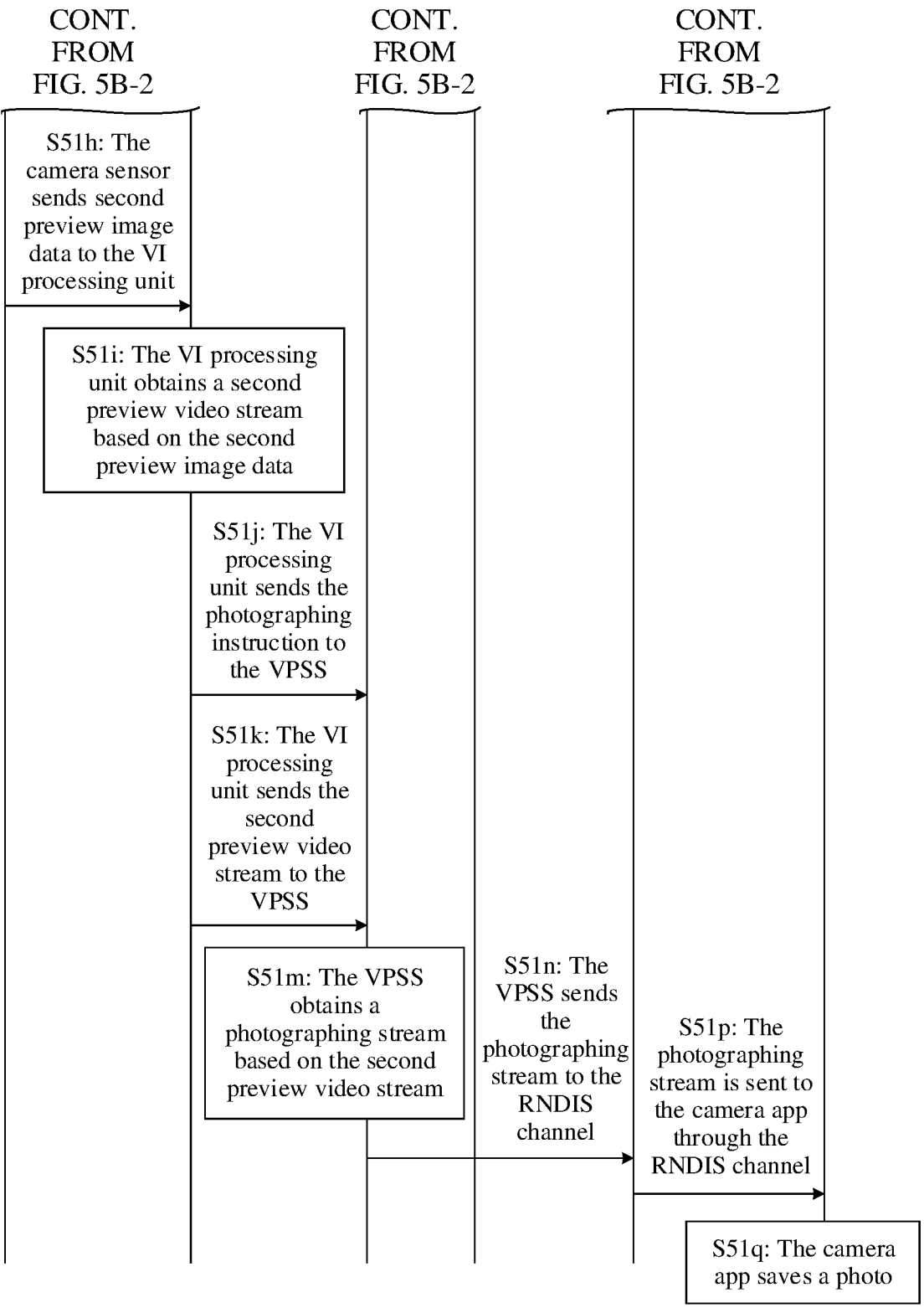

An embodiment of this application further provides a photographing method. As shown in FIG. 5B-1 to FIG. 5B-3, the method may include the following steps.

S511: Receive an instruction of opening a camera app by a user.

For a specific step of S511, refer to S501. Details are not described herein again.

S512: The camera app sends a first preview instruction to a UVC channel in response to receiving the instruction of opening the camera app by the user.

In an implementation, the camera app sends the first preview instruction to the UVC channel in response to receiving the operation of opening the camera app by the user, where the first preview instruction is used to instruct to start photographing preview. It may be understood that the camera app is installed in an operating system of a main processor. That the camera app sends the first preview instruction to the UVC channel means that the main processor sends the first preview instruction to the UVC channel. In an implementation, the first preview instruction includes first resolution. In an implementation, the first resolution is a default value. For example, the first resolution is a first default value (for example, 2560×1440). In another implementation, the value of the first resolution is determined based on a selection by the user. For example, refer to FIG. 7A to FIG. 7C. A "Photo Resolution" interface 703 includes a plurality of resolution options. The user may select one option as photo resolution. For example, the "Photo Resolution" interface 703 may include an "18 MP" option 704, a "4 MP" option 705, a "24 MP" option 706, and a "6 MP" option 707, which correspond to 18 megapixels, 4 megapixels, 24 megapixels, and 6 megapixels respectively. In an example, the "18 MP" option 704 indicates that a photo is taken by using 18 megapixels in an aspect ratio of 16:9. Corresponding photo resolution is 5632×3168, and corresponding first resolution is 2560×1440.

S513: The UVC channel sends the first preview instruction to a VI processing unit.

S514: The VI processing unit sends the first preview instruction to a camera sensor.

S515: The camera sensor starts photographing preview, and collects a video image at the first resolution.

The camera sensor receives the first preview instruction, obtains the first resolution based on the first preview instruction, and collects the video image at the first resolution, to form preview image data.

S516: The camera sensor sends the preview image data to the VI processing unit.

S517: The VI processing unit obtains a preview video stream based on the preview image data.

For a specific step of S517, refer to S507. Details are not described herein again.

S518: The VI processing unit sends the preview video stream to a VPSS.

S519: The VPSS sends the preview video stream to the UVC channel.

S51a: The preview video stream is sent to the camera app through the UVC channel.

Resolution of the video stream is the first resolution. In an implementation, the video stream is sent to the camera app through the UVC channel at a first transmission rate (for example, 30 fps).

S51b: The camera app renders and plays the video stream.

S51c: Receive a photographing instruction of the user.

For specific steps of S51b and S51c, refer to S50c and S50d. Details are not described herein again.

S51d: The camera app sends the photographing instruction to an RNDIS channel in response to receiving the photographing instruction of the user.

In an implementation, the camera app sends the photographing instruction to the RNDIS channel in response to receiving the photographing instruction of the user. In an implementation, the photographing instruction includes second resolution, and the second resolution is greater than the first resolution. For example, the second resolution is 5632×3168. It may be understood that the camera app is installed in the operating system of the main processor. That the camera app sends the photographing instruction to the RNDIS channel means that the main processor sends the photographing instruction to the RNDIS channel.

S51e: The RNDIS channel sends the photographing instruction to the VI processing unit.

In an implementation, the photographing instruction includes the second resolution.

S51f: The VI processing unit sends the photographing instruction to the camera sensor.

S51g: The camera sensor collects a video image at the second resolution.

The camera sensor receives the photographing instruction, obtains the second resolution based on the photographing instruction, and collects the video image at the second resolution, to form second preview image data.

S51h: The camera sensor sends the second preview image data to the VI processing unit.

S51i: The VI processing unit obtains a second preview video stream based on the second preview image data.

The VI processing unit receives the second preview image data, and preprocesses the second preview image data to obtain the second preview video stream. For example, the VI processing unit may perform processing such as filtering and noise reduction, target enhancement, and image segmentation on the second preview image data.

S51j: The VI processing unit sends the photographing instruction to the VPSS.

S51k: The VI processing unit sends the second preview video stream to the VPSS.

S51m: The VPSS obtains a photographing stream based on the second preview video stream.

After receiving the photographing instruction, the VPSS captures one or more frames of images of the second preview video stream to form the photographing stream. Resolution of the second preview video stream and resolution of the photographing stream are the second resolution.

Optionally, the VPSS compresses the resolution of the second preview video stream to the first resolution, to form a second video stream, and sends the second video stream to the UVC channel. The second video stream is sent to the camera app through the UVC channel. The camera app receives the second video stream, and renders the second video stream. A smart screen plays the rendered second video stream by using a display, that is, displays a photographing preview interface. Resolution of the photographing preview interface is the first resolution.

S51n: The VPSS sends the photographing stream to the RNDIS channel.

In an implementation, after image enhancement processing is performed on the photographing stream obtained by the VPSS, the photographing stream is sent to the RNDIS channel.

S51p: The photographing stream is sent to the camera app through the RNDIS channel.

In an implementation, the photographing stream is sent to the camera app through the RNDIS channel at a second transmission rate. The second transmission rate is less than the first transmission rate. For example, the second transmission rate is 2 fps. In this way, the photographing stream is sent through the RNDIS channel at high resolution and a low transmission rate, to obtain a high-definition photo.

S51q: The camera app saves a photo.

The camera app receives the photographing stream and saves the photographing stream as a photo. Resolution of the photo is the second resolution. For example, the user may open a family album to view the saved photo.

An embodiment of this application provides a photographing method. During photographing preview, a camera collects an image at low resolution, and transmits a video stream to a main processor through a first transmission channel at low resolution and a high transmission rate, to ensure smoothness of the video stream. During photographing, the camera collects an image at high resolution, and transmits a photographing stream to the main processor through a second transmission channel at high resolution and a low transmission rate, to obtain a high-definition photo. In this way, an ultra-high-definition photo can be obtained and a clear and smooth preview video can be ensured.

It may be understood that, to implement the foregoing functions, the electronic device includes a corresponding hardware structure and/or software module for performing each of the functions. It may be understood that, with reference to units and algorithm steps of the examples described in embodiments disclosed in this specification, embodiments of this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of embodiments of this application.

In embodiments of this application, the electronic device may be divided into function modules based on the foregoing method examples. For example, each function module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 8:
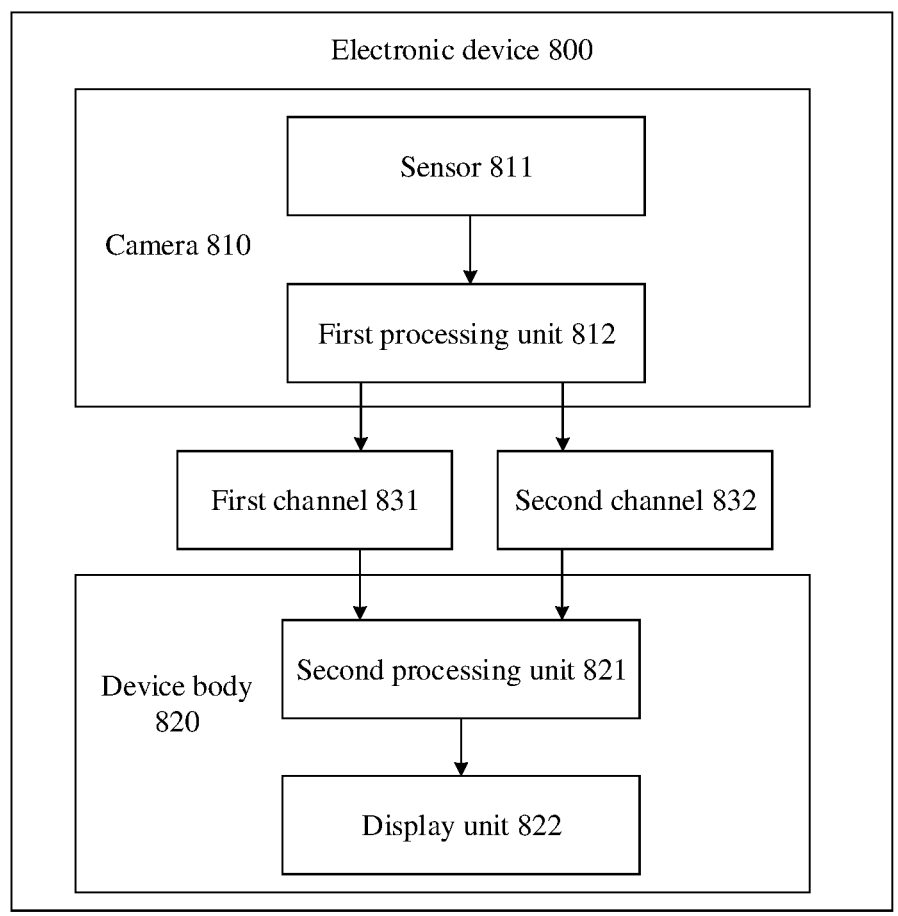
FIG. 8 is a schematic diagram of structure composition of an electronic device according to an embodiment of this application.

When an integrated unit is used, FIG. 8 is a possible schematic diagram of a structure of the electronic device in the foregoing embodiments. An electronic device 800 includes a camera 810 and a device body 820. The camera 810 includes a sensor 811 and a first processing unit 812. The device body 820 includes a second processing unit 821 and a display unit 822. The camera 810 and the device body 820 may exchange data through a first channel 831 or a second channel 832. Specifically, the first processing unit 812 and the second processing unit 821 exchange data through the first channel 831 or the second channel 832.

The sensor 811 is configured to collect an image, for example, may be configured to perform the processing steps of S505 and S506 in FIG. 5A-1 to FIG. 5A-3, or processing steps of S515, S516, S51g, and S51h in FIG. 5B-1 to FIG. 5B-3; and/or another process of the technology described in the specification.

The first processing unit 812 is configured to perform image processing, for example, may be configured to perform processing steps of S504, S507 to S50a, 50g, and S50h in FIG. 5A-1 to FIG. 5A-3, or processing steps of S514, S517 to S519, S51f, and S51i to S51n in FIG. 5B-1 to FIG. 5B-3, and/or another process of the technology described in the specification.

The first channel 831 is used to transmit a video stream and instructions related to the video stream, for example, may be used to perform the processing steps of S503 and S115b in FIG. 5A-1 to FIG. 5A-3, or processing steps in S513 and S51a in FIG. 5B-1 to FIG. 5B-3, and/or another process of the technology described in the specification.

The second channel 832 is used to transmit a photographing stream and instructions related to the photographing stream, for example, may be used to perform the processing steps of S503, S50f, and S50i in FIG. 5A-1 to FIG. 5A-3, or processing steps of S51e and S51p in FIG. 5B-1 to FIG. 5B-3, and/or another process of the technology described in the specification.

The second processing unit 821 is configured to control and manage an action of the electronic device 800, and interact with a user (for example, receive a user instruction), for example, may be configured to perform processing steps of S501, S502, S50c to S50e, and S50j in FIG. 5A-1 to FIG. 5A-3, or processing steps of S511, S512, S51b to S51d, and S51q in FIG. 5B-1 to FIG. 5B-3, and/or another process of the technology described in the specification.

The display unit 822 is configured to display a display interface of the electronic device 800, for example, may be configured to display a photographing preview interface, a setting interface, a photo, and the like.

Certainly, units and modules in the electronic device 800 include but are not limited to the sensor 811, the first processing unit 812, the first channel 831, the second channel 832, the second processing unit 821, and the display unit 822. For example, the electronic device 800 may further include a storage unit, a communication unit, an audio unit, and the like. The storage unit is configured to store program code and data of the electronic device 800. The communication unit is configured to support communication between the electronic device 800 and another apparatus, for example, may be configured to receive a control signal of a remote control. The audio unit is configured to play a sound and the like.

The sensor 811 may be a sensor of a camera. The first processing unit 812 may be a video processor or another programmable logic device, a transistor logic device, a hardware component, or any combination thereof. The first processing unit 812 may implement or execute various example logical blocks, modules, and circuits described with reference to content disclosed in this application. The first channel 831 and the second channel 832 may be USB channels. The second processing unit 821 may be a processor or a controller, for example, may be a central processing unit (central processing unit, CPU), a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The storage unit may be a memory. The communication unit may be a transceiver, a transceiver circuit, a communication interface, or the like. The display unit 822 may be a display. The audio unit may include a speaker, a receiver, and the like.

For example, the sensor 811 is an image collection sensor (for example, the sensor 121 shown in FIG. 2), the first processing unit 812 is a processor (for example, the video processor 122 shown in FIG. 2), the second processing unit 821 is a processor (for example, the main processor 111 shown in FIG. 2), the storage unit may be a memory (for example, the memory 112 shown in FIG. 2), the communication unit may be a wireless communication module (for example, the wireless communication module 115 shown in FIG. 2), the display unit 822 may be a display (for example, the display 114 shown in FIG. 2), and the audio unit may include a speaker (for example, the speaker 113A shown in FIG. 2). The electronic device 800 provided in this embodiment of this application may be the electronic device 100 shown in FIG. 2. The processor, the memory, the communication module, and the like may be coupled together, for example, connected through a bus.

An embodiment of this application further provides a computer-readable storage medium. The computer-readable storage medium stores computer program code, and when a processor executes the computer program code, an electronic device performs related method steps in FIG. 5A-1 to FIG. 5A-3 or FIG. 5B-1 to FIG. 5B-3 to implement the method in the foregoing embodiments.

An embodiment of this application further provides a computer program product. When the computer program product is run on a computer, the computer is enabled to perform related method steps in FIG. 5A-1 to FIG. 5A-3 or FIG. 5B-1 to FIG. 5B-3 to implement the method in the foregoing embodiments.

The electronic device 800, the computer-readable storage medium, and the computer program product provided in embodiments of this application each are configured to perform the corresponding methods provided above. Therefore, for beneficial effects that can be achieved by the electronic device 800, the computer-readable storage medium, and the computer program product, refer to the beneficial effects in the corresponding methods provided above. Details are not described herein again.

The foregoing descriptions about implementations allow a person skilled in the art to understand that, for the purpose of convenient and brief description, division into the foregoing functional modules is taken as an example for illustration. During actual application, the foregoing functions can be allocated to different modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, division into the modules or the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may be one or more physical units, may be located in one place, or may be distributed on different places. Some or all of the units may be selected according to actual requirements to achieve the objectives of the solutions of the embodiments.

In addition, function units in embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, applied to an electronic device, the method comprising:
    collecting, by a camera of the electronic device, a video image, and obtaining a video stream with a first resolution and first frame rate based on the video image;
    transmitting, by the camera, the video stream to a device body of the electronic device through a first transmission channel;
    displaying, by the device body, the video stream using a display of the device body;
    obtaining, by the camera, a photographing stream with a second resolution and second frame rate based on the video image in response to the camera receiving a photographing instruction through a second transmission channel, wherein the second resolution is greater than the first resolution and the second frame rate is slower than the first frame rate;
    transmitting, by the camera, the photographing stream to the device body through the second transmission channel, wherein the second transmission channel is different from the first transmission channel; and
    obtaining, by the device body, a photo based on the photographing stream.

2. The method according to claim 1, wherein:
    collecting, by the camera, the video image, and obtaining the video stream with the first resolution and the first frame rate based on the video image comprises:
        collecting, by the camera, a first video image at the second resolution, and processing the first video image to obtain the video stream with the first resolution; and
    obtaining, by the camera, the photographing stream with the second resolution and the second frame rate based on the video image comprises:
        obtaining, by the camera, the photographing stream with the second resolution and the second frame rate based on the first video image.

3. The method according to claim 2, wherein obtaining, by the camera, the photographing stream with the second resolution and the second frame rate based on the first video image comprises:
    capturing, by the camera, one or more frames of images of the first video image to form the photographing stream.

4. The method according to claim 1, wherein:
collecting, by the camera, the video image, and obtaining the video stream with the first resolution and the first frame rate based on the video image comprises:
collecting, by the camera, a second video image at the first resolution, and obtaining the video stream with the first resolution and the first frame rate based on the second video image; and
obtaining, by the camera, the photographing stream with the second resolution and the second frame rate based on the video image in response to the device body receiving the photographing instruction comprises:
in response to the device body receiving the photographing instruction, collecting, by the camera, a first video image at the second resolution, and obtaining the photographing stream with the second resolution and the second frame rate based on the first video image.

5. The method according to claim 4, wherein obtaining, by the camera, the photographing stream with the second resolution and the second frame rate based on the first video image comprises:
capturing, by the camera, one or more frames of images of the first video image to form the photographing stream.

6. The method according to claim 1, further comprising:
obtaining, by the camera, an artificial intelligence (AI) stream with a third resolution based on the video image, wherein the third resolution is less than the first resolution; and
performing, by the camera, image enhancement processing on the video image based on the AI stream.

7. The method according to claim 1, wherein the camera and the device body are connected to each other using a universal serial bus (USB) connection implementing the first transmission channel and the second transmission channel, the first transmission channel is a USB video class (UVC) channel, and the second transmission channel is a remote network driver interface specification (RNDIS) channel.

8. An electronic device, comprising:
a device body comprising a display; and
a camera connected to the device body, wherein the camera is configured to:
collect a video image, and obtain a video stream with a first resolution and first frame rate based on the video image; and
transmit the video stream to the device body through a first transmission channel;
wherein the device body is configured to:
display the video stream using the display;
receive a photographing instruction through a second transmission channel; and
in response to the device body receiving the photographing instruction, obtain a photographing stream with a second resolution and second frame rate based on the video image collected by the camera, wherein the second resolution is greater than the first resolution and the second frame rate is slower than the first frame rate;
wherein the camera is further configured to:
transmit the photographing stream to the device body through the second transmission channel, wherein the second transmission channel is different from the first transmission channel; and
wherein the device body is further configured to:
obtain a photo based on the photographing stream.

9. The electronic device according to claim 8, wherein the camera is configured to:
collect a first video image at the second resolution;
process the first video image to obtain the video stream with the first resolution and the first frame rate; and
obtain the photographing stream with the second resolution and the second frame rate based on the first video image.

10. The electronic device according to claim 9, wherein the camera being configured to obtain the photographing stream with the second resolution and the second frame rate based on the first video image comprises the camera being configured to:
capture one or more frames of images of the first video image to form the photographing stream.

11. The electronic device according to claim 8, wherein the camera is configured to:
collect a second video image at the first resolution, and obtain the video stream with the first resolution and the first frame rate based on the second video image; and
in response to the device body receiving the photographing instruction, collect a first video image at the second resolution, and obtain the photographing stream with the second resolution and the second frame rate based on the first video image.

12. The electronic device according to claim 11, wherein the camera being configured to obtain the photographing stream with the second resolution and the second frame rate based on the first video image comprises the camera being configured to:
capture one or more frames of images of the first video image to form the photographing stream.

13. The electronic device according to claim 8, wherein the camera is further configured to:
obtain an artificial intelligence (AI) stream with a third resolution based on the video image, wherein the third resolution is less than the first resolution; and
perform image enhancement processing on the video image based on the AI stream.

14. The electronic device according to claim 8, wherein the camera and the device body are connected to each other using a universal serial bus (USB) connection implementing the first transmission channel and the second transmission channel, the first transmission channel is a USB video class (UVC) channel, and the second transmission channel is a remote network driver interface specification (RNDIS) channel.

15. A non-transitory computer-readable storage medium, wherein the non-transitory computer-readable storage medium stores computer instructions, and when the computer instructions are run on an electronic device, the electronic device is enabled to perform:
collecting, by a camera of the electronic device, a video image, and obtaining a video stream with a first resolution and first frame rate based on the video image;
transmitting, by the camera, the video stream to a device body of the electronic device through a first transmission channel;
displaying, by the device body, the video stream using a display of the device body;
obtaining, by the camera, a photographing stream with a second resolution and second frame rate based on the video image in response to the camera receiving a photographing instruction through a second transmission channel, wherein the second resolution is greater than the first resolution and the second frame rate is slower than the first frame rate;

transmitting, by the camera, the photographing stream to the device body through the second transmission channel, wherein the second transmission channel is different from the first transmission channel; and obtaining, by the device body, a photo based on the photographing stream.

16. The non-transitory computer-readable storage medium according to claim 15, wherein
collecting, by the camera, the video image, and obtaining the video stream with the first resolution and the first frame rate based on the video image comprises:
collecting, by the camera, a first video image at the second resolution, and processing the first video image to obtain the video stream with the first resolution; and
obtaining, by the camera, the photographing stream with second resolution and the second frame rate based on the video image comprises:
obtaining, by the camera, the photographing stream with the second resolution and the second frame rate based on the first video image.

17. The non-transitory computer-readable storage medium according to claim 16, wherein obtaining, by the camera, the photographing stream with the second resolution and the second frame rate based on the first video image comprises:
capturing, by the camera, one or more frames of images of the first video image to form the photographing stream.

18. The non-transitory computer-readable storage medium according to claim 15, wherein
collecting, by the camera, the video image, and obtaining the video stream with the first resolution and the first frame rate based on the video image comprises:
collecting, by the camera, a second video image at the first resolution, and obtaining the video stream with the first resolution and the first frame rate based on the second video image; and
obtaining, by the camera, the photographing stream with the second resolution and the second frame rate based on the video image in response to the device body receiving the photographing instruction comprises:
in response to the device body receiving the photographing instruction, collecting, by the camera, a first video image at the second resolution, and obtaining the photographing stream with the second resolution and the second frame rate based on the first video image.

19. The non-transitory computer-readable storage medium according to claim 18, wherein obtaining, by the camera, the photographing stream with the second resolution and the second frame rate based on the first video image comprises:
capturing, by the camera, one or more frames of images of the first video image to form the photographing stream.

20. The non-transitory computer-readable storage medium according to claim 15, wherein the computer instructions further enable the electronic device to perform:
obtaining, by the camera, an artificial intelligence (AI) stream with a third resolution based on the video image, wherein the third resolution is less than the first resolution; and
performing, by the camera, image enhancement processing on the video image based on the AI stream.

* * * * *